(12) United States Patent
Vu et al.

(10) Patent No.: US 7,387,063 B2
(45) Date of Patent: Jun. 17, 2008

(54) BEVERAGE BREWING SYSTEM

(75) Inventors: Robert B. Vu, Houston, TX (US);
Jacqueline Y. Vu, Houston, TX (US);
Tuan "Peter" Anh Dieu, Houston, TX (US)

(73) Assignee: JavaVoo, LLC, Houston, TX (US)

( * ) Notice: Subject to any disclaimer, the term of this patent is extended or adjusted under 35 U.S.C. 154(b) by 315 days.

(21) Appl. No.: 10/878,581

(22) Filed: Jun. 28, 2004

(65) Prior Publication Data

US 2005/0211102 A1   Sep. 29, 2005

Related U.S. Application Data

(60) Provisional application No. 60/556,767, filed on Mar. 29, 2004.

(51) Int. Cl.
*A47J 31/02* (2006.01)
*A47J 31/24* (2006.01)
*B65D 85/00* (2006.01)

(52) U.S. Cl. .............................. 99/306; 99/295; 99/316; 99/323.3; 426/433; 426/115; 219/689; 206/217; 206/223

(58) Field of Classification Search ................... 99/306, 99/304, 299, 307, 316, 295, 275, 279, 323.3; 219/689, 687; 426/77, 78, 79, 80, 433, 115; 206/217, 223, 221, 219, 222; 220/495.03; 215/6, DIG. 8

See application file for complete search history.

(56) References Cited

U.S. PATENT DOCUMENTS 2,732,787 A * 1/1956 Osborne ...................... 99/306
3,589,272 A * 6/1971 Bouladon et al. ............. 99/295
3,978,233 A * 8/1976 Bolt ........................... 426/115
4,104,957 A    8/1978 Freedman et al.
4,167,899 A    9/1979 McCormick
4,345,512 A    8/1982 Moore
4,381,696 A    5/1983 Koral
4,386,109 A * 5/1983 Bowen et al. ............... 426/241
4,577,080 A    3/1986 Grossman
4,627,334 A * 12/1986 Shanklin ...................... 99/306
4,721,835 A    1/1988 Welker
4,908,222 A    3/1990 Yu
4,990,734 A    2/1991 Hirsch
5,012,059 A    4/1991 Boatman
5,064,980 A * 11/1991 Grossman et al. ........... 219/689
5,104,666 A *  4/1992 Sanvitale ...................... 426/77

(Continued)

FOREIGN PATENT DOCUMENTS

EP    1 169 957 A1    1/2002

*Primary Examiner*—Reginald L Alexander
(74) *Attorney, Agent, or Firm*—Slater & Matsil, L.L.P.

(57) ABSTRACT

A beverage brewing system is adapted to have a brewing configuration, in which, a brewing chamber has a brewing substance therein, a bottle initially has a fluid therein, a lid is located over a cup, the bottle is removably attached to the lid and located over the lid, the brewing chamber is located between the bottle and the cup, and a blow-out valve is located between the bottle and the brewing chamber so that the blow-out valve initially hinders a flow of the fluid from the bottle to the brewing chamber. The blow-out valve is adapted to be breached at a predetermined pressure when the fluid is heated to allow the fluid to pass through the brewing chamber into the cup to form a brewed fluid. The entire system is preferably disposable and microwavable. Preferably, the system has a compact storage configuration and a portable drinking configuration as well.

71 Claims, 30 Drawing Sheets

U.S. PATENT DOCUMENTS

| | | | |
|---|---|---|---|
| 5,243,164 A * | 9/1993 | Erickson et al. | 219/689 |
| 5,300,308 A * | 4/1994 | Louridas | 426/112 |
| 5,747,782 A | 5/1998 | Orrico et al. | |
| 5,832,809 A * | 11/1998 | Gras | 99/299 |
| 6,065,609 A * | 5/2000 | Lake | 210/474 |
| 6,298,771 B1 | 10/2001 | Calvento | |
| 6,622,615 B2 * | 9/2003 | Heczko | 99/323.3 |
| 6,808,083 B2 * | 10/2004 | Roekens et al. | 221/150 HC |
| 6,889,599 B2 * | 5/2005 | Koslow | 99/306 |
| 6,948,421 B2 * | 9/2005 | Meador | 99/300 |

\* cited by examiner

BEVERAGE BREWING SYSTEM

This application claims the benefit of U.S. Provisional Application No. 60/556,767 filed on Mar. 29, 2004, entitled Self Contained Disposable Microwave Beverage Brewing Device, which application is hereby incorporated herein by reference.

TECHNICAL FIELD

The present invention relates generally to systems and methods of brewing beverages. In one aspect it relates more particularly to a microwaveable and disposable kit forming beverage brewing system that also may be used for serving the beverage after brewing.

BACKGROUND

Espresso and cappuccino machines can be expensive, and the process of making a cup of espresso or cappuccino with such machines is often cumbersome, time consuming, and/or very messy. Many people who own such machines will discontinue using them after realizing the time and effort required to make a cup of espresso/cappuccino and to clean up the mess it creates. This may be one of the reasons so many people are willing to pay large sums of money for such beverages at coffee shops (e.g., Starbucks Coffee® shops). However, many people desire to have a fresh brewed cup of espresso or cappuccino without having to leave their home. Hence, a need exists for a way to provide a fresh brewed beverage at home, but without the cost, mess, effort, and time required of many espresso/cappuccino machines.

One attempt to solve this problem was products adapted to be mixed with hot water (rather than brewed), such as instant coffee and instant coffee drink mixes. However, the resulting beverage from such products often does not have the same quality and freshness of coffee brewed using a machine and a brewing process. Hence, a need exists for a way to conveniently make a freshly brewed beverage quickly and without a mess, yet without sacrificing in taste and quality.

Other prior attempts to provide a freshly brewed beverage in a quick and convenient manner typically involve a machine or device, which typically still requires cleaning. Many people prefer using paper, polystyrene (e.g., Styrofoam®), or plastic cups that can be discarded after use rather having to wash the cup. Disposable items are now a normal part of American culture. There are many disposable food product packages, and there are even disposable cameras. Yet, no currently known device for brewing a beverage is designed to be self-contained, inexpensive, and disposable after a single use. Thus, a need exists for a beverage brewing system that is simple to use, inexpensive, and disposable.

SUMMARY OF THE INVENTION

The problems and needs outlined above may be addressed by embodiments of the present invention. In accordance with one aspect of the present invention, a beverage brewing system adapted to have a storage configuration, a brewing configuration, and a drinking configuration, is provided. The beverage brewing system includes a cup, a lid, a bottle portion adapted to retain a fluid therein, a brewing chamber portion adapted to retain a brewing substance therein, and a first blow-out valve member. In the storage configuration, the lid is located over the cup, and the bottle portion is located in the cup. In the brewing configuration, the brewing chamber portion has the brewing substance therein, the bottle portion initially has the fluid therein, the bottle portion is hermetically sealed, the lid is located over the cup, the bottle portion is removably attached to the lid and located over the lid, the brewing chamber portion is located between the bottle portion and the cup, and the first blow-out valve member is located between the bottle portion and the brewing chamber portion so that the first blow-out valve member initially hinders a flow of the fluid from the bottle portion to the brewing chamber. The first blow-out valve member is adapted to be breached at a first predetermined pressure developed in the bottle portion during the heating of the fluid within the bottle portion. In the drinking configuration, a brewed fluid is located in the cup. The brewed fluid is derived from brewing the brewing substance in the brewing chamber portion with the fluid after the blow-out valve is breached.

In accordance with another aspect of the present invention, a disposable beverage brewing system adapted to have a brewing configuration, is provided. The system includes a disposable drinking cup, a disposable plastic lid, a disposable plastic bottle portion adapted to retain a fluid therein, a disposable plastic brewing chamber portion adapted to retain a brewing substance therein, and a plastic blow-out valve member. The brewing chamber portion having a first hole formed therein. The blow-out valve member is bonded to a surface of the brewing chamber portion to cover the first hole. The blow-out valve member is adapted to at least partially separate from the surface of the brewing chamber portion at a first predetermined pressure. In the brewing configuration, the brewing chamber portion has the brewing substance therein, the bottle portion initially has the fluid therein, the bottle portion is hermetically sealed, the lid is located over the cup, the bottle portion is removably attached to the lid and located over the lid, the brewing chamber portion is located between the bottle portion and the cup, the bottle portion and the brewing chamber portion are supported by the lid, and the first hole and the first blow-out valve member are located between the bottle portion and the brewing chamber portion so that the first blow-out valve member initially hinders a flow of the fluid from the bottle portion to the brewing chamber through the first hole.

In accordance with yet another aspect of the present invention, a method of brewing a beverage using a beverage brewing system, is provided. This method includes the following steps described in this paragraph. The order of the steps may vary, may be sequential, may overlap, may be in parallel, and combinations thereof. A freshness seal is removed. The freshness seal covers one or more drip holes that open to an interior of a brewing chamber portion of the system. A brewing configuration for the system is formed. In the brewing configuration, a lid is over a cup, the lid has a bottle portion removably attached thereto, the lid is located between the bottle portion and the cup, the lid supports the bottle portion, the bottle portion has a fluid therein, the brewing chamber portion comprises a brewing substance therein, the brewing chamber portion is located between the bottle portion and the cup, the brewing chamber portion has a first hole formed therein, a first blow-out valve member is bonded to a surface of the brewing chamber portion to cover the first hole, and the bottle portion is hermetically sealed at least in part by the first blow-out valve member. Contents in the bottle portion are heated. This increases the temperature and pressure of the contents within the bottle portion. The contents include the fluid. When the heated contents within the bottle portion reach a first predetermined pressure, the first blow-out valve member is breached using the heated contents within the bottle portion, thereby allowing the fluid to enter the brewing chamber portion. The brewing substance is brewed with the fluid in the brewing chamber portion. A brewed fluid is dispensed into the cup from the brewing chamber portion via the drip holes.

The foregoing has outlined rather broadly features of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

The following is a brief description of the drawings, which illustrate exemplary embodiments of the present invention and in which.

DETAILED DESCRIPTION OF ILLUSTRATIVE EMBODIMENTS

Figure 1:
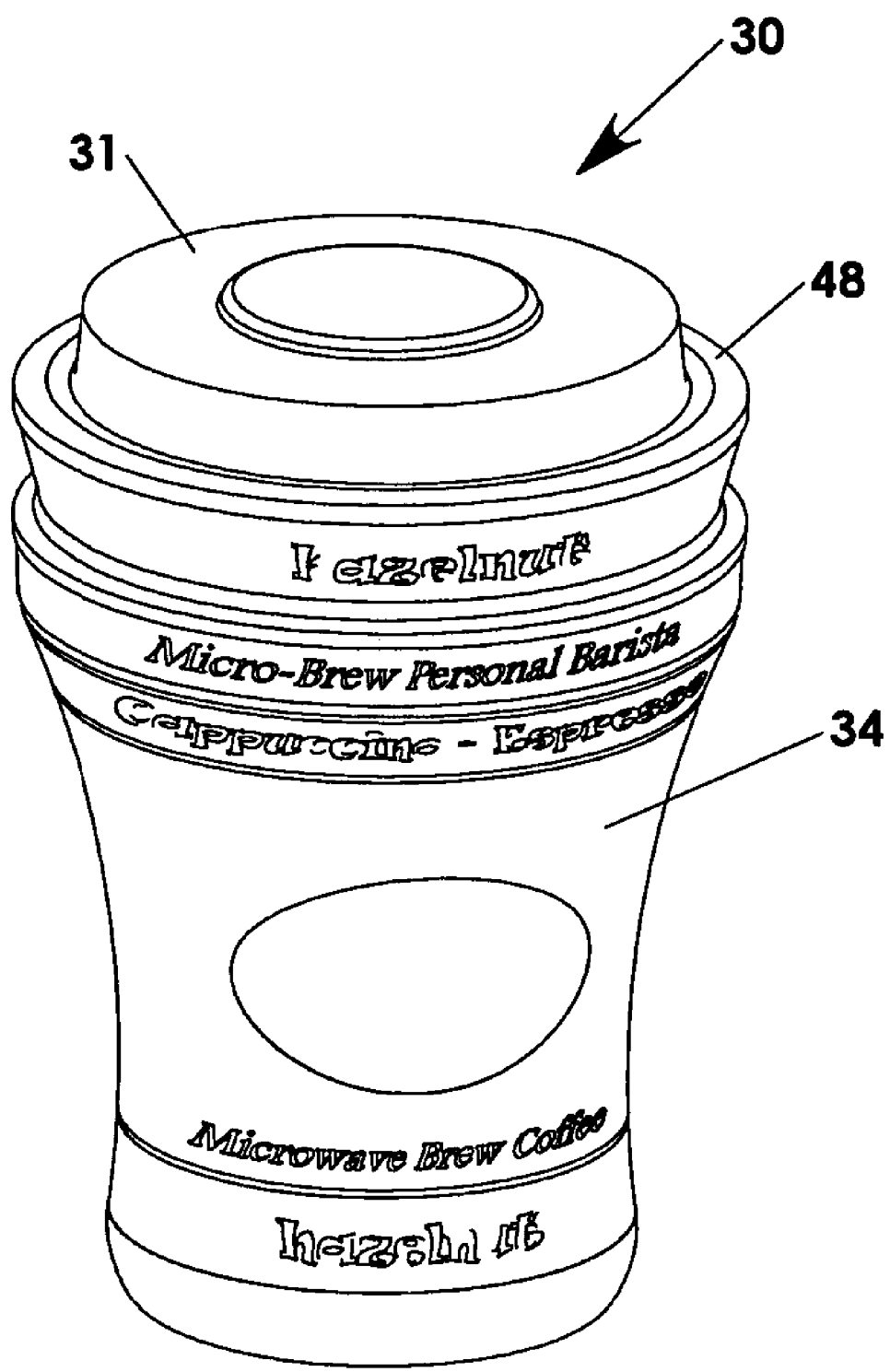
FIG. 1 is a perspective view of a package beverage brewing system of a first illustrative embodiment of the present invention.

Referring now to the drawings, wherein like reference numbers are used herein to designate like or similar elements throughout the various views, illustrative embodiments of the present invention are shown and described. The figures are not necessarily drawn to scale, and in some instances the drawings have been exaggerated and/or simplified in places for illustrative purposes only. One of ordinary skill in the art will appreciate the many possible applications and variations of the present invention based on the following illustrative embodiments of the present invention.

An embodiment of the present invention preferably provides a self-contained beverage brewing system adapted to have at least one of a storage configuration, a brewing configuration, and a drinking configuration. Preferably, an embodiment of the present invention is microwavable, relatively inexpensive, and disposable. FIGS. 1-18 show various views and configurations for a beverage brewing system 30 in accordance with a first embodiment of the present invention.

Regarding the beverage brewing system 30 of the first embodiment, first it will be described generally while discussing uses of the system 30. Then, the components of the first embodiment will be described in more detail. The first embodiment will be described in the context of the system 30 being adapted to provide a fresh brewed cup of cappuccino or espresso, for example.

Figure 2:
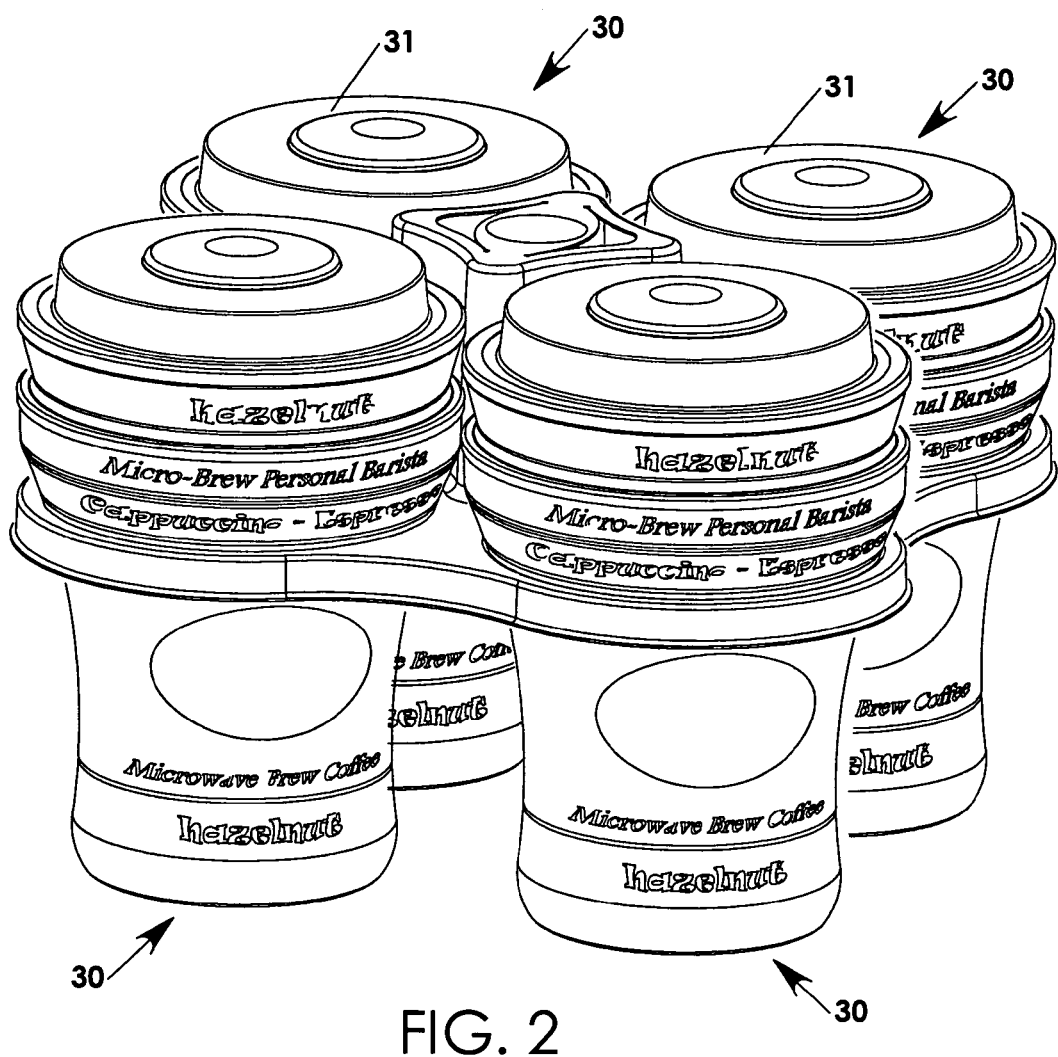
FIG. 2 shows an illustrative bundled configuration for providing a plurality of the packaged beverage brewing systems of the first embodiment together (e.g., a four-pack)

FIG. 1 is a perspective view of a package beverage brewing system 30 of the first embodiment in a storage configuration. FIG. 2 shows an illustrative bundled configuration for providing a plurality of the packaged beverage brewing systems 30 together (e.g., a four-pack). In the packaged configuration (see e.g., FIGS. 1 and 2), the system 30 may have a shrink-fit plastic cover or wrapper covering all or part of the system 30. Hence, such cover or wrapper may be used to keep all or part of the system 30 clean and sanitary during the handling of the packaged system 30. Also, such cover or wrapper may be used to keep the edible substances within the system 30 fresh and sealed (or further sealed) from the environment. In the illustrative embodiment shown in FIGS. 1 and 2, a removable package cover 31 covers part of the lid, for example.

Figure 3:
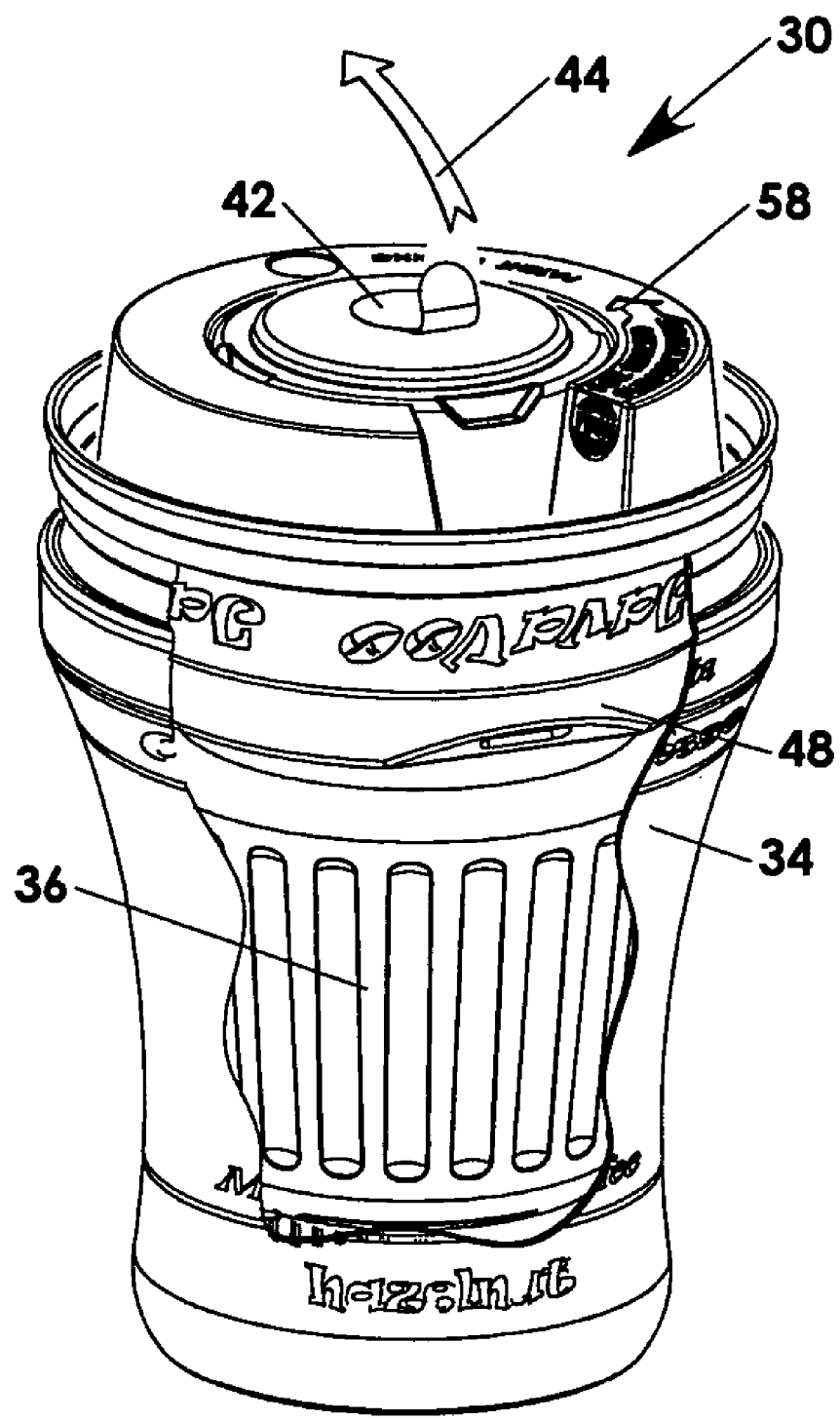
FIG. 3 shows the beverage brewing system of FIG. 1 in a storage configuration with part of the drinking cup cut away to illustrate a bottle portion located in the cup.
Figure 4:
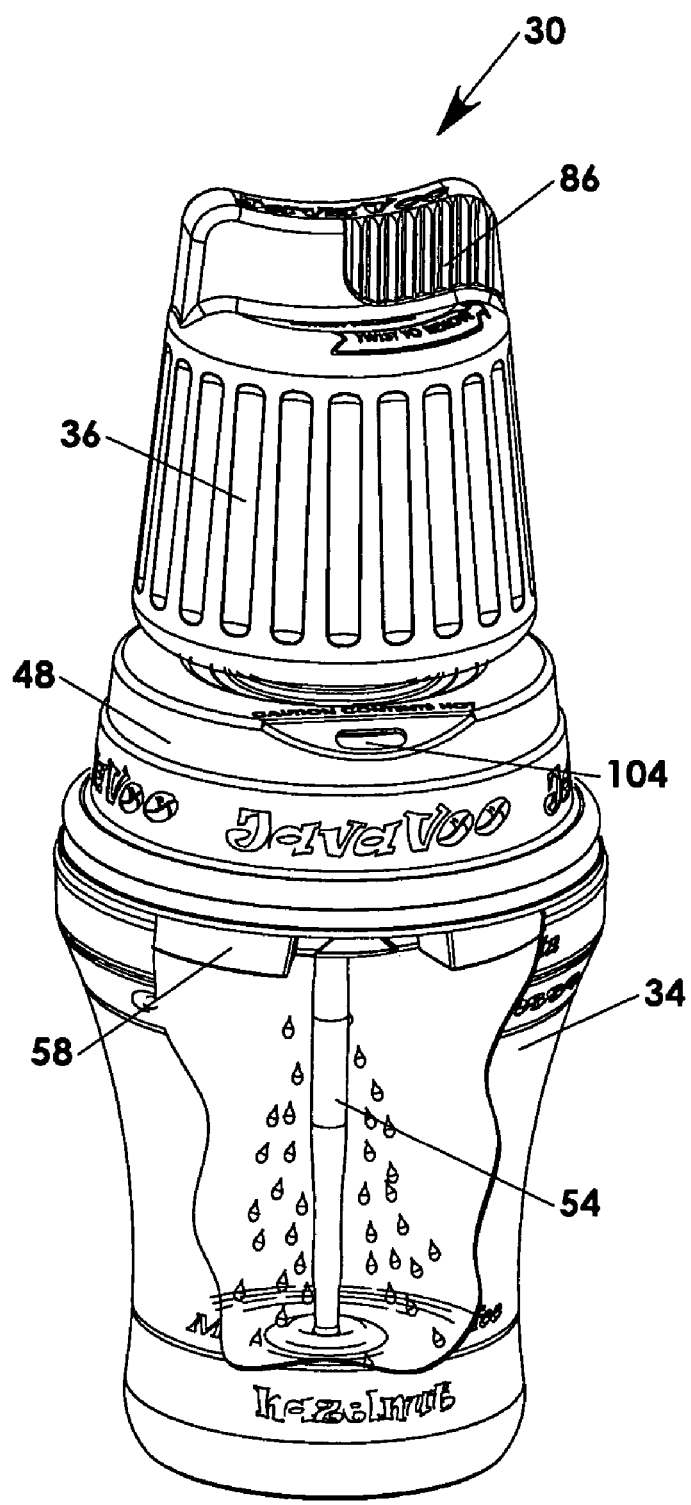
FIG. 4 shows a perspective view of the system of the first embodiment in a brewing configuration (e.g., for cappuccino)
Figure 5:
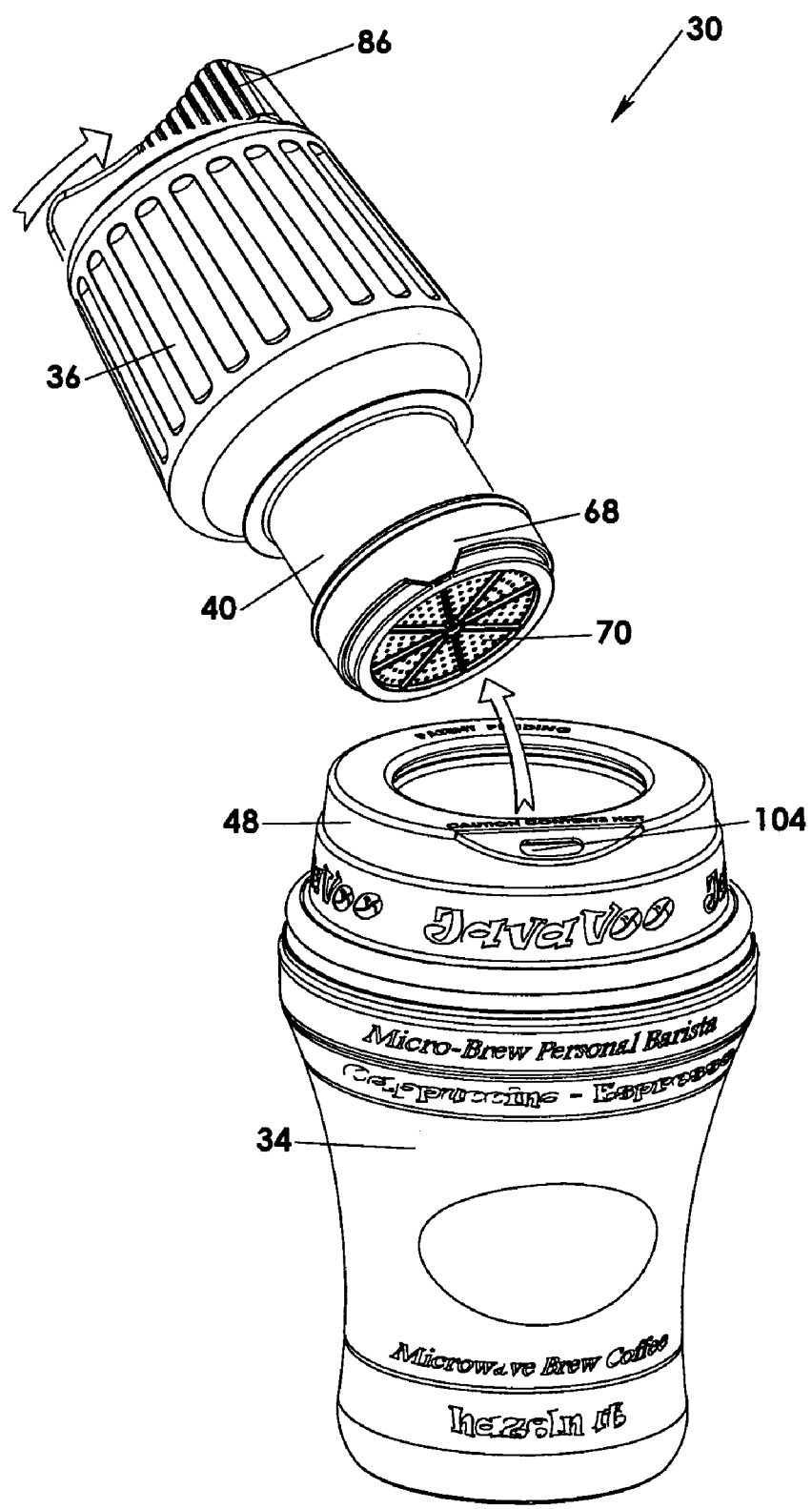
FIG. 5 shows a perspective view of the system of the first embodiment in a drinking configuration.

FIG. 3 shows the beverage brewing system 30 of FIG. 1 without the cover 31 thereon. In FIG. 3, part of the drinking cup 34 is cut away to illustrate a bottle portion 36 of the system 30 that is preferably stored within the cup 34 in the storage configuration. In a preferred embodiment, the system 30 is packaged with water (preferably filter and/or distilled water) in the bottle portion 36 and with ground coffee beans 38 already in a brewing chamber portion 40 (shown and described below) of the system 30. FIG. 4 shows a perspective view of the system 30 in a brewing configuration. Again, a portion of the cup 34 has been cut-away in FIG. 4 for illustration purposes. In FIG. 5, the system 30 is shown in a drinking configuration. In the first embodiment, the system 30 includes a drinking cup 34, which typically will be used to drink the brewed beverage from during normal use of the system 30.

Referring back to FIG. 1, a use of the system 30 of the first embodiment to make cappuccino will be described briefly now. The shrink-fit or shrink-wrap packaging (if any) is removed from system 30 to provide the configuration shown in FIG. 3. Next, a freshness seal 42 is removed, as illustrated by arrow 44 in FIG. 3. The lid 48, having the bottle portion 36 attached thereto, is then removed, turned over, and placed back on the cup 34 to form a brewing configuration, as shown in FIG. 4. The beverage brewing system 30 (in the brewing configuration) is then placed in a microwave oven, for example, to heat the water 50 in the bottle portion 36. When the contents of the bottle portion 36 (e.g., water 50 and air) reach a first predetermined pressure due to the heating in the microwave oven, a first blow-out valve member 52 is breached (as described in more detail below). The breaching of the first blow-out valve member 52 allows the water 50 (preferably boiling hot) from the bottle portion 36 to pass through the brewing chamber portion 40 (where the ground coffee beans 38 are located) to the cup 34, as illustrated in FIG. 4. As the hot water passes through the brewing chamber portion 40, it brews the coffee beans 38 to produce a fresh brewed coffee 54, or espresso in this example.

Referring again to FIG. 3, a secondary fluid chamber portion 58 is shown attached to the lid 48. In the first embodiment, this secondary fluid chamber portion 58 is filled with milk and/or cream to be used in forming a cappuccino beverage. A cappuccino typically includes espresso mixed with milk and having a boiled milk foam or froth on top. The secondary fluid chamber portion 58 has a second blow-out valve member 62 that is adapted to be breached when the contents of the secondary fluid chamber portion 58 reach a second predetermined pressure, as described in more detail below. During a use of the first embodiment to make a cappuccino drink, the secondary blow-out valve member 62 is preferably breached when the milk (and/or cream) in the secondary fluid chamber portion 58 boils. Then, the hot milk is dispensed into the cup 34 to mix with the espresso. Some of the boiled milk becomes milk foam, which is also dispensed into the cup 34. Most of the foam remains floating on the top of the fluid 54 in the cup 34 to provide the often desired milk foam or froth on top.

FIG. 5 illustrates the formation of a drinking configuration for the first embodiment. In the first embodiment, the bottle portion 36 and the brewing chamber portion 40 are removed (after the brewing) to form a drinking configuration with the lid 48 still in place on the cup 34. Alternatively, the lid 48 also may be removed (with or without the bottle portion 36 and/or the brewing chamber portion 40). Thus, the configurations shown in FIGS. 3-5 illustrate a use of an embodiment to form a fresh brewed cup of cappuccino.

Figure 6:
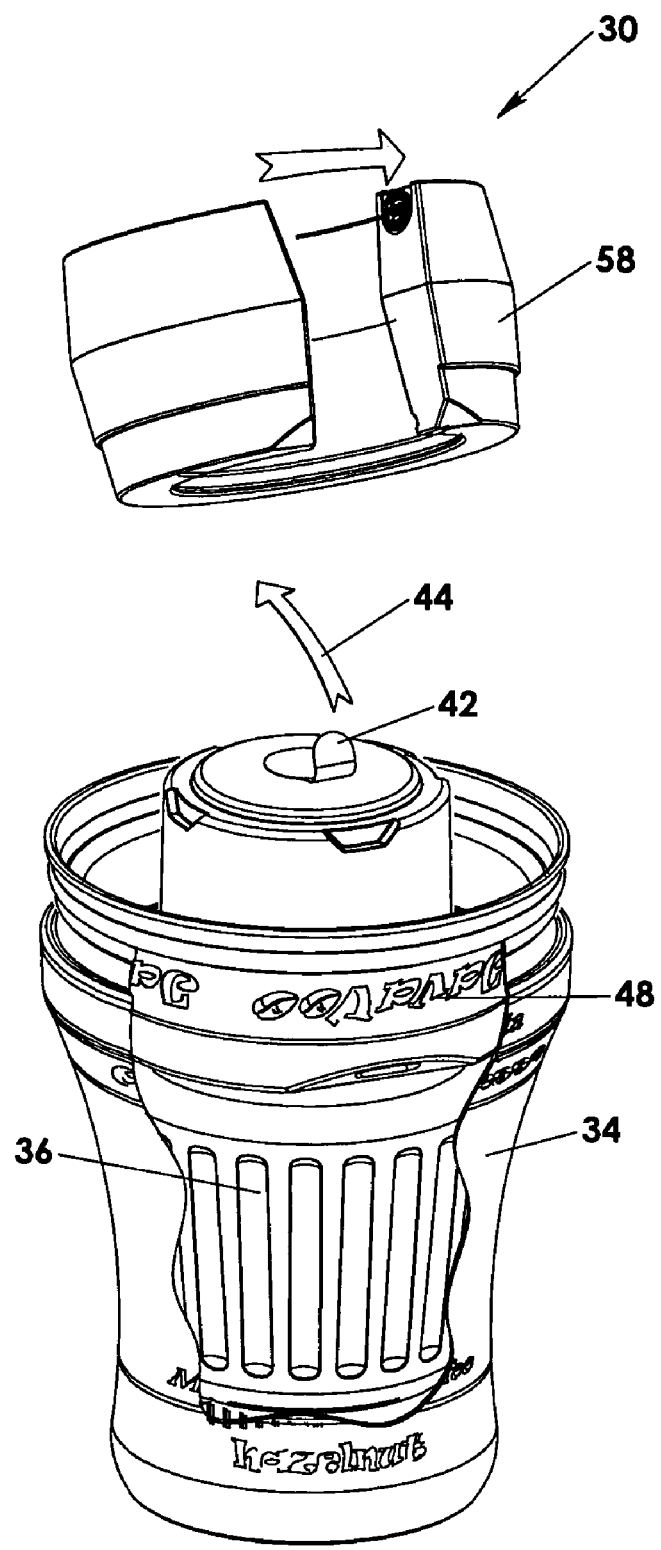
FIG. 6 shows a perspective view of the system of the first embodiment in an alternative brewing configuration (e.g., for espresso)

The first embodiment is also adapted to provide a fresh brewed cup of espresso, instead of cappuccino. The secondary fluid chamber portion 58 is adapted to be easily removed, as illustrated in FIG. 6. As described in more detail below, the secondary fluid chamber portion 58 is snapped onto the lid 48 and may be removed by pivoting the secondary fluid chamber portion 58 relative to the lid 48 (thereby causing it to unsnap from the lid 48) (see e.g., FIG. 6). Thus, when the system of the first embodiment is heated in the brewing configuration having the secondary fluid chamber portion 58 removed, espresso will be made instead of cappuccino.

A beverage brewing system 30 of an embodiment is preferably a self-contained, ready to use kit or system that is easy to use and that already contains the beverage ingredients. Also, the entire system 30 is preferably disposable to eliminate the need for cleanup after preparing the beverage. Furthermore, all of the components of the system 30 in the brewing configuration are preferably microwaveable.

Figure 7:
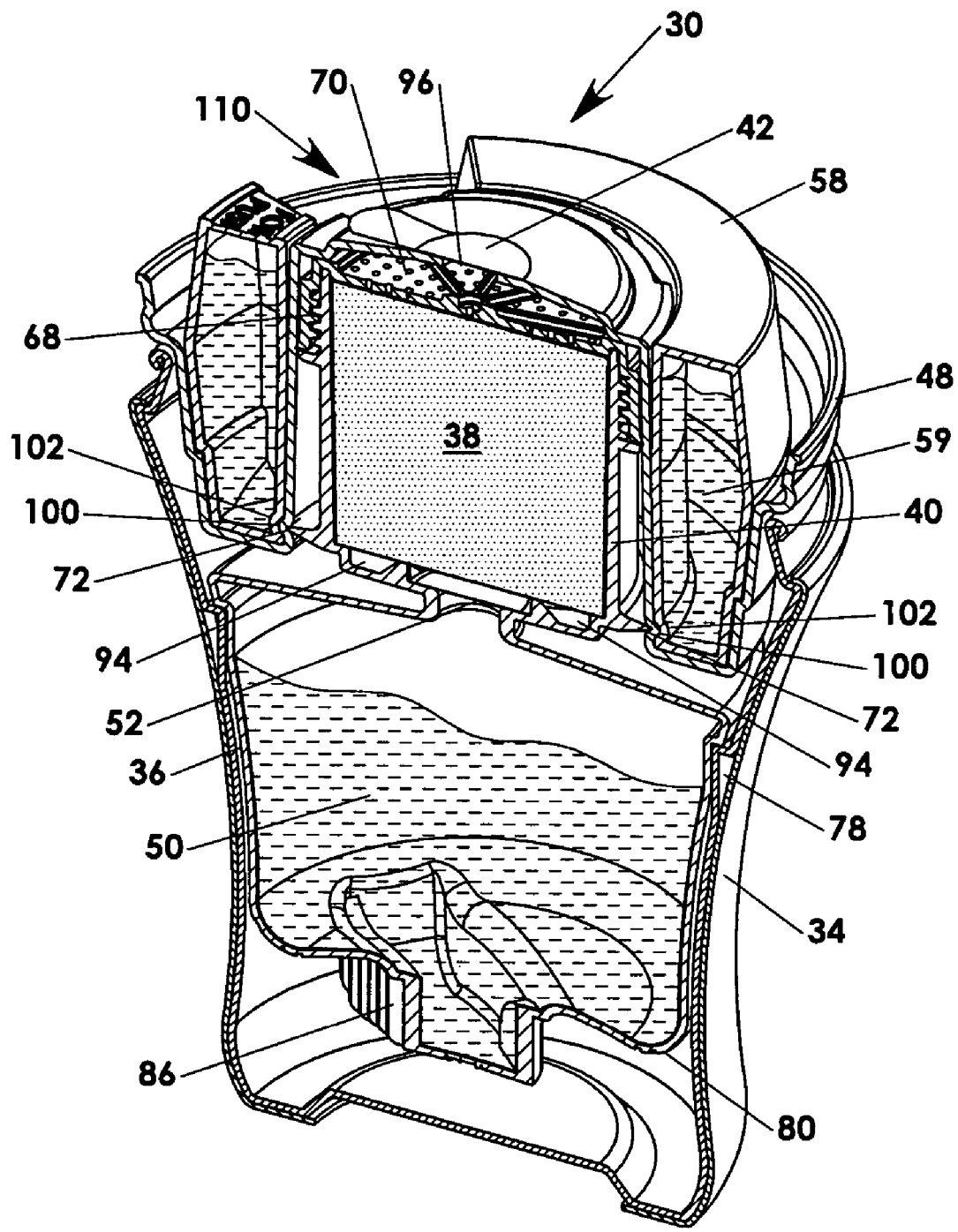
FIG. 7 is a cross-section view of the beverage brewing system of the first embodiment in the storage configuration.
Figure 8:
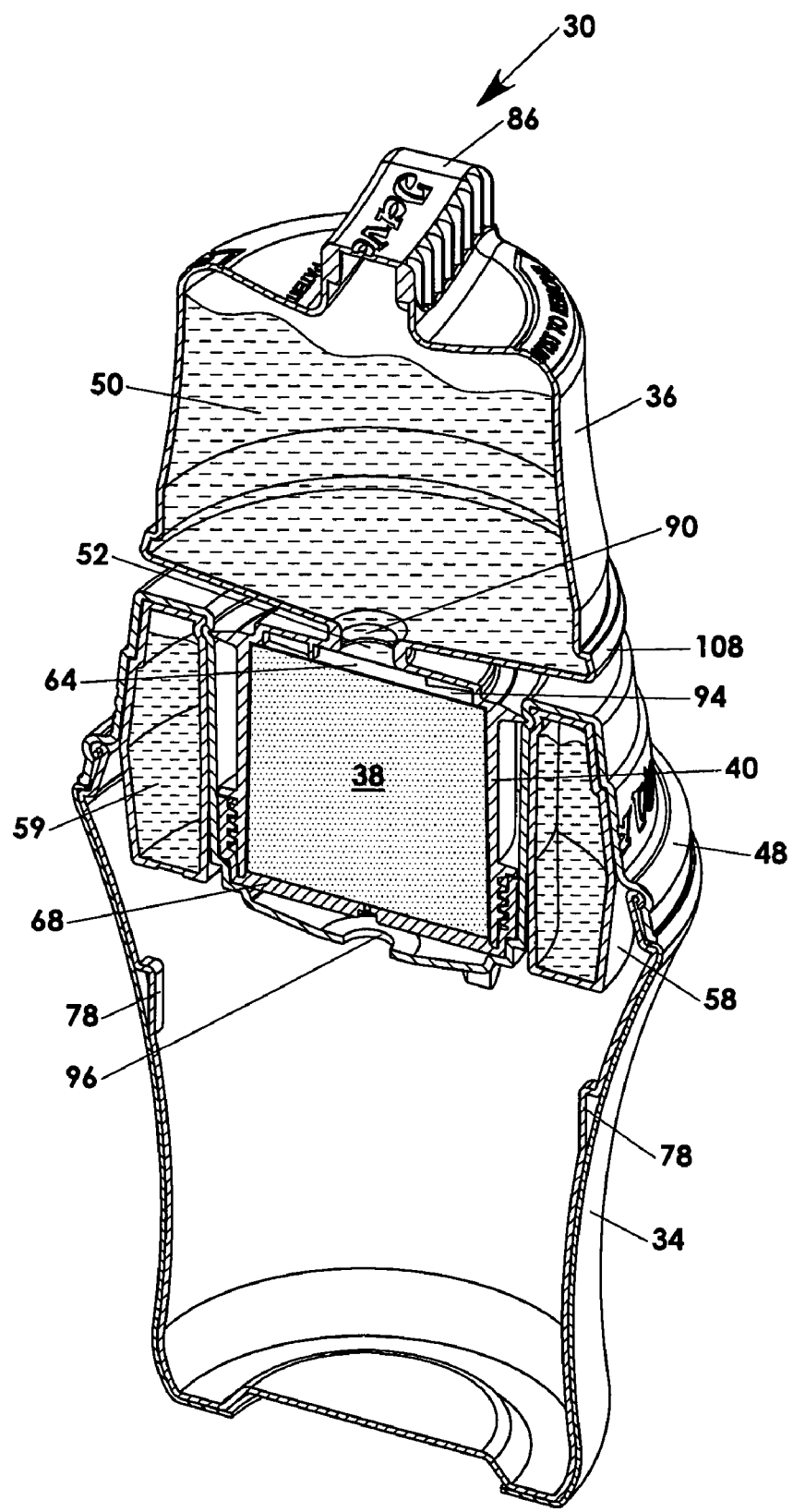
FIG. 8 is a cross-section view of the system of the first embodiment in a brewing configuration.
Figure 9:
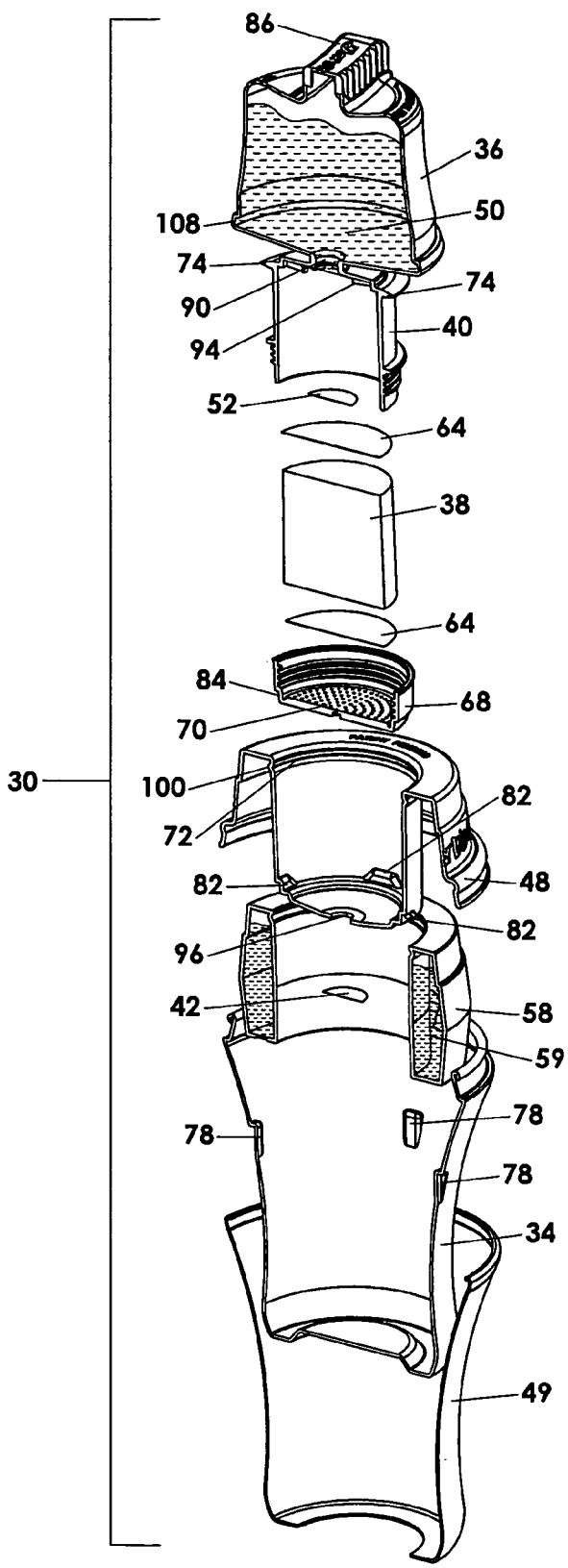
FIG. 9 is an exploded cross-section view of the system of the first embodiment.

Now that a few uses of the system 30 have been described briefly and illustrated in FIGS. 3-6, the components of the first embodiment will be described in more detail with reference to FIGS. 7-18. FIG. 7 is a cross-section view of the beverage brewing system 30 of the first embodiment in the storage configuration. FIG. 8 is a cross-section view of the system 30 in a brewing configuration. FIG. 9 is an exploded cross-section view of the system 30 to better illustrate some of the individual components of the first embodiment.

As illustrated in FIG. 7, for example, a preferred embodiment has a storage configuration that strives to minimize the volume consumed by the system 30 while also providing a storage configuration that is easily converted to a brewing configuration. In the first embodiment, the bottle portion 36, the brewing chamber portion 40, the lid 48, and the secondary fluid chamber portion 58 are attached together in an operable manner as a unit. Hence, this unit is simply removed from the cup 34, turned over, and placed back on the cup 34 to form a brewing configuration, as shown in FIG. 8. In other embodiments, more or less assembly of the system 30 may be required to go from a storage configuration or a packaged configuration to a brewing configuration.

In the first embodiment, the water 50, ground coffee beans 38, and milk 59 are provided with and already operably placed within the beverage brewing system 30, as shown in FIG. 7. As shown in FIG. 9, filter elements 64 may be provided on each side of the ground coffee beans 38. In other embodiments, the ground coffee beans 38 may be partially or completely surrounded by a filter material. Alternatively, an embodiment may omit such filter elements 64. As shown in FIGS. 7-9, a cover 68 having drip holes 70 formed therein may be threadedly coupled to the brewing chamber portion 40 to retain the ground coffee beans 38 therein. The cover 68 may be considered part of the brewing chamber portion 40. In other embodiments, such cover 68 may be permanently attached (e.g., bonded, fused, adhered, fastened) to the brewing chamber portion 40. Also, the number and placement of the drip holes 70 may be varied in other embodiments. An embodiment may have just one drip hole or just a few drip holes 70, for example.

Some or all of the brewing ingredients (e.g., water 50, milk, ground coffee beans 38) may not be provided with a system of another embodiment. In such case, a user may need to disassemble and/or assemble part of the system 30 while installing one or more of the brewing ingredients.

In the first embodiment, the brewing chamber portion 40 is an integral part of the bottle portion 36. In the brewing configuration (see e.g., FIG. 8), the brewing chamber portion 40 is located between the bottle portion 36 and the cup 34. Also, the brewing chamber portion 40 and the bottle portion 36 of the first embodiment are adapted to be snapped into the lid 48 and supported by the lid 48 in the brewing configuration (see e.g., FIG. 8). The lid 48 may have a groove 72 formed therein, which corresponds to a tongue portion 74 extending from the brewing chamber portion 40 (and/or from the bottle portion 36), as shown in FIGS. 7-9. In a preferred embodiment, a hermetic seal is formed when the tongue portion 74 is located within the groove 72; but in other embodiments, such sealing may not be needed or may not occur.

In the storage configuration, the bottle portion 36 may be supported by one or more step features 78 extending from an interior wall of the cup 34, as shown in FIG. 7, for example. These step features 78 of the first embodiment may be used to prevent the filled bottle portion 36 and brewing chamber portion 40 from becoming disengaged from the lid 48 in the storage configuration and during shipping and handling of the system 30. In another embodiment (not shown), the bottle portion 36 may have a length so that a top 80 of the bottle portion 36 rests on the interior bottom of the cup 34 in the storage configuration. Hence, in such case the filled bottle portion 36 and brewing chamber 40 may be supported (at least in part) by the interior bottom of the cup 34. In such case, the step features 78 formed in the cup 34 may not be needed and may be omitted, although the step features 78 may be retained for additional support, if desired.

As shown in FIGS. 5 and 9, the lid 48 may have one or more ramp extensions 82 formed therein and the cover 68 (or the brewing chamber portion 40 in other embodiments) may have corresponding recesses 84 having a mating shape or sufficient volume within the recesses 84 to accept the ramp extensions 82 therein (or at least partially therein). In the first embodiment, when the brewing chamber portion 40 is snapped into the lid 48 (as discussed above and as shown in FIGS. 7 and 8), the ramp extensions 82 reside in the recesses 84 of the cover 68. To remove the bottle portion 36 and the brewing chamber portion 40, the bottle portion 36 may be twisted or rotated relative to the lid 48, thereby causing the cover 68 to engage the ramp extensions 82. The ramp extensions 82 then act as a wedge causing the brewing chamber portion 40 to move longitudinally relative to the lid 48, thereby causing the tongue 74 of the brewing chamber portion 40 to be forced out of the groove 72 formed in the lid 48. This is illustrated in FIG. 5. Although an optional feature, a preferred embodiment includes a knob portion 86 on the outside of the bottle portion 36 to aid in gripping the bottle portion 36 during the removal of the bottle portion 36. In the first embodiment, a knob portion 86 is integrally formed into the shaped of the bottle portion 36.

As shown in FIGS. 7-9 for the first embodiment, a first hole 90 is formed between the bottle portion 36 and the brewing chamber portion 40. A first blow-out member 52 covers the first hole 90 to initially hinder or prevent a flow of the fluid 50 from the bottle portion 36 to the brewing chamber portion 40. Hence, the interior of the bottle portion 36 would be fluidly connected to the interior of the brewing chamber portion 40 if the first blow-out valve member 52 were not there. Although a single hole 90 is located between the bottle portion 36 and the brewing chamber portion 40 in the first embodiment, there may be two or more of such holes (of variety of sizes and placements) in other embodiments.

Figure 10:
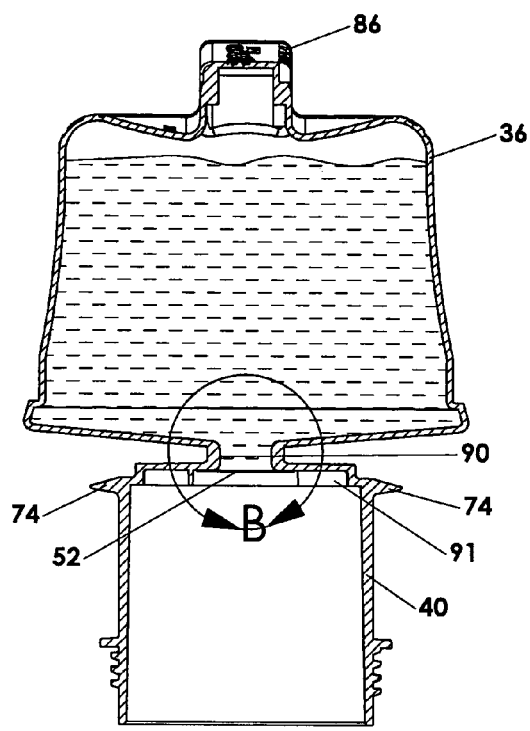
FIG. 10 is a cross-section view of the bottle portion and part of the brewing chamber portion (cover removed) of the first embodiment.
Figure 11:
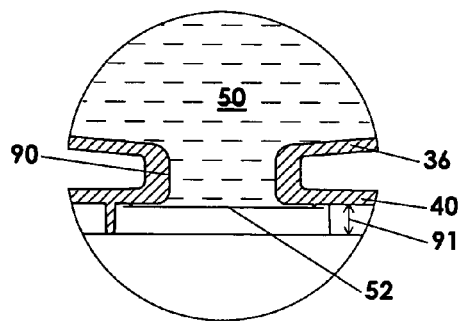
FIGS. 11 and 12 are enlarged views of area B from FIG. 10.
Figure 12:
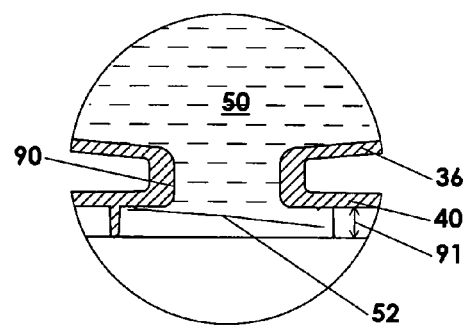
Figure 13:
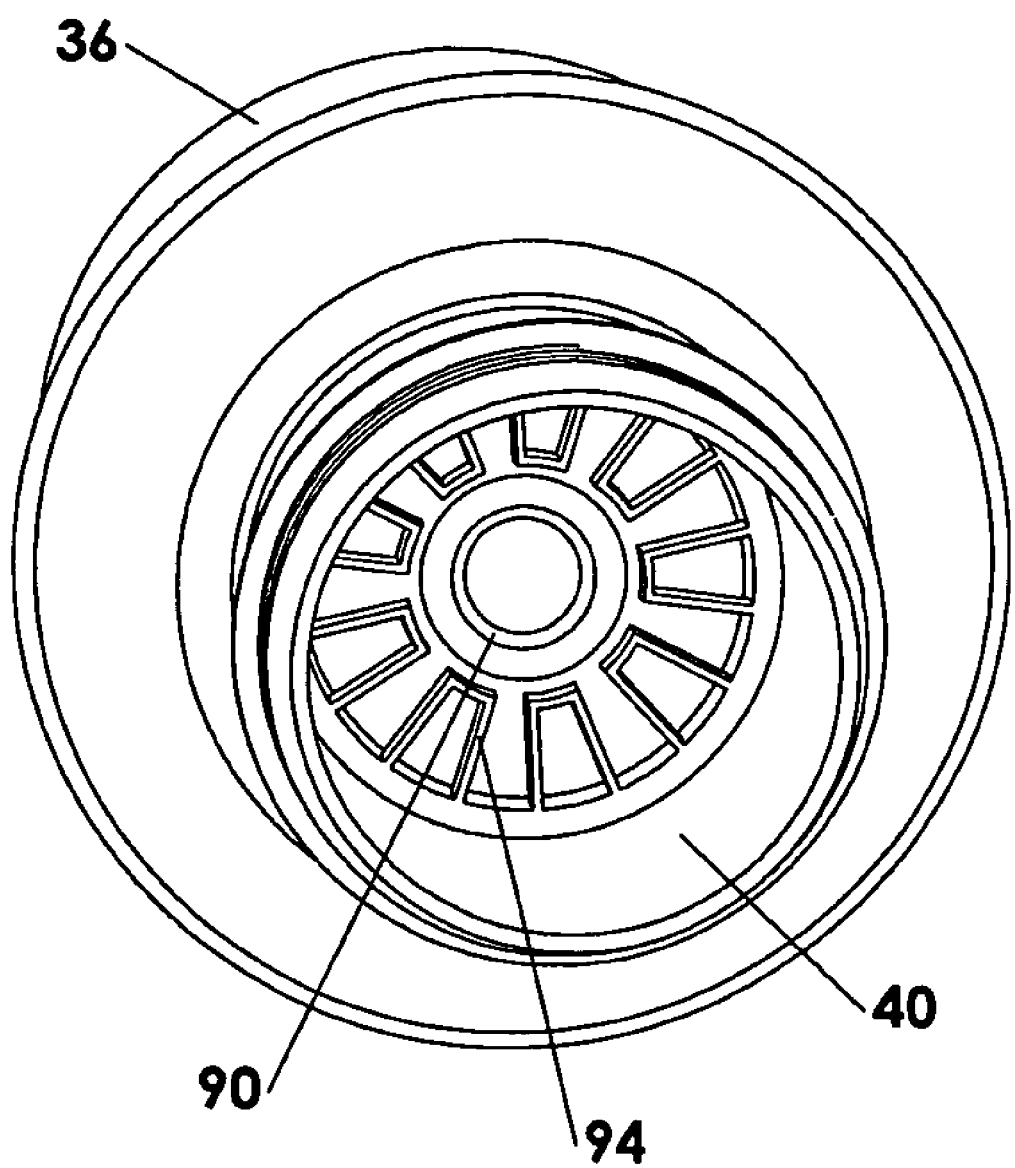
FIG. 13 is a bottom view of the bottle portion and the inside of the brewing chamber portion (cover removed) of the first embodiment.

FIG. 10 is a cross-section view of the bottle portion 36 and part of the brewing chamber portion 40 (cover 68 removed). FIGS. 11 and 12 are enlarged views of area B from FIG. 10 to illustrate the first blow-out valve member 52 and its functions. FIG. 13 is a bottom view of the bottle portion 36 and the inside of the brewing chamber portion 40 (cover 68 removed). The brewing substance 38 (e.g., ground coffee beans) is not shown within the brewing chamber portion 40 in FIGS. 10-13 for purposes of illustrating features of the brewing chamber portion 40.

In the first embodiment, the first blow-out valve member 52 is bonded to an interior surface of the brewing chamber portion 40 (see e.g., FIGS. 7 and 11). The first blow-out valve member 52 initially prevents the fluid 50 in the bottle portion 36 from exiting the bottle portion 36 and from entering the brewing chamber portion 40. The first blow-out valve member 52 may be bonded to the brewing chamber portion 40 in any of a variety of suitable ways, including (but not limited to): adhesive, ultrasonic welding, heat, stamped pressure, fused, and combinations thereof, for example. Preferably, the bottle portion 36 is hermetically sealed, as least in part, by the first blow-out valve member 52. The first blow-out valve member 52 of the first embodiment is adapted to be breached when the contents of the bottle portion 36 reach or exceed a first predetermined pressure. Preferably, this first predetermined pressure occurs at a point when the fluid 50 inside the bottle portion 36 is at, near, or above its boiling temperature. In the first embodiment, the first blow-out valve member 52 is adapted to at least partially separate from the interior surface of the brewing chamber portion 40 at the first predetermined pressure, as illustrated in FIG. 12, for example. The heating of the contents within the hermetically sealed bottle portion 36 causes the pressure to increase along with the temperature. The pressure of the heated contents then presses against the first blow-out valve member 52 causing it to be breached. In other embodiments, the first blow-out valve member 52 may have a different mechanism for being breached than that shown in FIG. 12. For example, the first blow-out valve member 52 may be breached by completely separating from the interior surface of the brewing chamber portion 40. In yet another example, the first blow-out valve member 52 may be breached by developing a breach hole and/or a tear in the first blow-out valve member 52 using the pressure of the bottle contents. In another embodiment, the first blow-out valve member 52 may be weakened by the increased temperature. In still another embodiment, the first blow-out valve member 52 may be melted or fused by the temperature of the contents in bottle portion 36 and/or the temperature of the first blow-out valve member 52 itself during the heating process (e.g., microwave heating). The breaching mechanism will likely depend on the material composition of the first blow-out valve member 52 and/or the strength of the bond between the first blow-out valve member 52 and the brewing chamber portion 40. Also, the bottle portion 36 may not need to be hermetically sealed during the initial stages of the brewing (in the brewing configuration) for another embodiment.

In the first embodiment, the first blow-out valve member 52 is separated from the brewing substance 38 by a first spaced distance 91 prior to the first blow-out valve member 52 being breached (see e.g., FIG. 11). This first spaced distance 91 provides space for the first blow-out valve member 52 to extend from the surface of the brewing chamber portion 40 after the breach (see e.g., FIG. 12). Also, as shown in FIG. 13, the first embodiment includes raised portions 94 adjacent to the location of the first blow-out valve member 52 to help maintain the first spaced distance 91 after the brewing substance 38 is placed in the brewing chamber portion 40. Note that in FIG. 13, the first blow-out valve member 52 is not shown.

Referring again to FIGS. 7-9, the lid 48 of the first embodiment includes a drip hole 96 that is fluidly connected to the brewing chamber portion 40. The portion of the lid 48 displaced to form the lid drip hole 96 may be retained as a tab that is folded away from the drip hole 96. In the drinking configuration, a user may desire to bend the tab back to partially cover the drip hole 96. In the first embodiment, the freshness seal 42 covers the drip hole 96 of the lid 48, which in turn seals the drip holes 70 formed in the brewing chamber portion 40 because the brewing chamber portion 40 is otherwise sealed by the configuration provided by the mating of the brewing chamber portion 40 to the lid 48 (see e.g., FIG. 7). In other embodiments, the drip hole 96 formed in the lid 48 for allowing the brewed fluid 54 to be dispensed from the brewing chamber portion 40 into the cup 34 may be a large hole or opening, and the freshness seal 42 may be placed directly over the drip hole(s) 70 formed in the brewing chamber portion 40. Also, the size and number of holes 96 formed in the lid 48 for allowing the brewed fluid 54 to be dispensed from the brewing chamber portion 40 into the cup 34 may vary for other embodiments.

Figure 14:
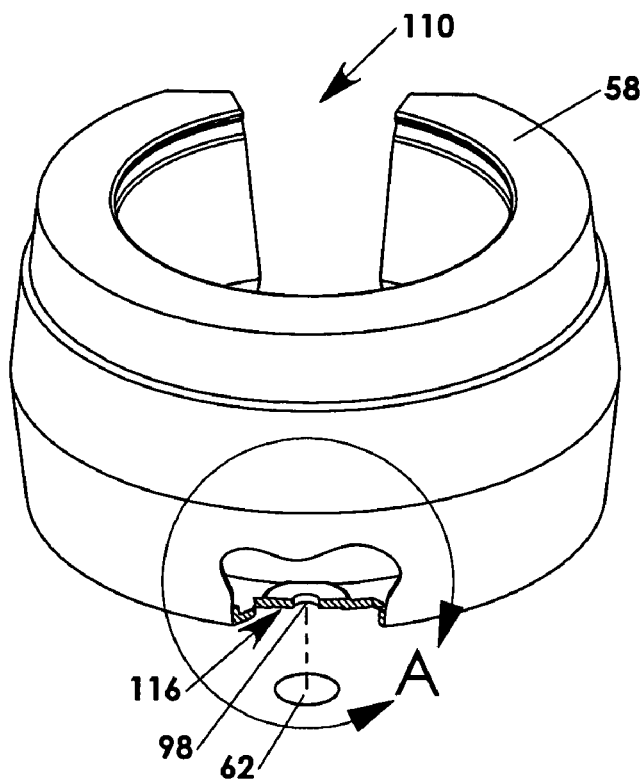
FIG. 14 is a perspective view of a secondary fluid chamber portion of the first embodiment.
Figure 15:
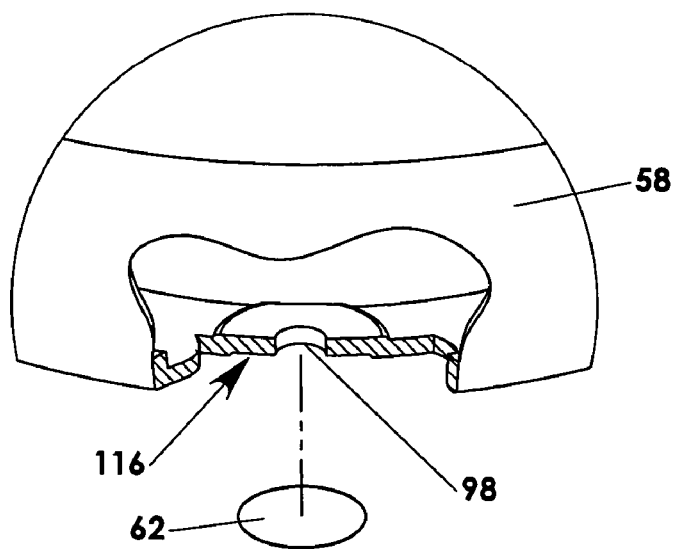
FIG. 15 is an enlarged detailed view of the area A in FIG. 14.
Figure 16:
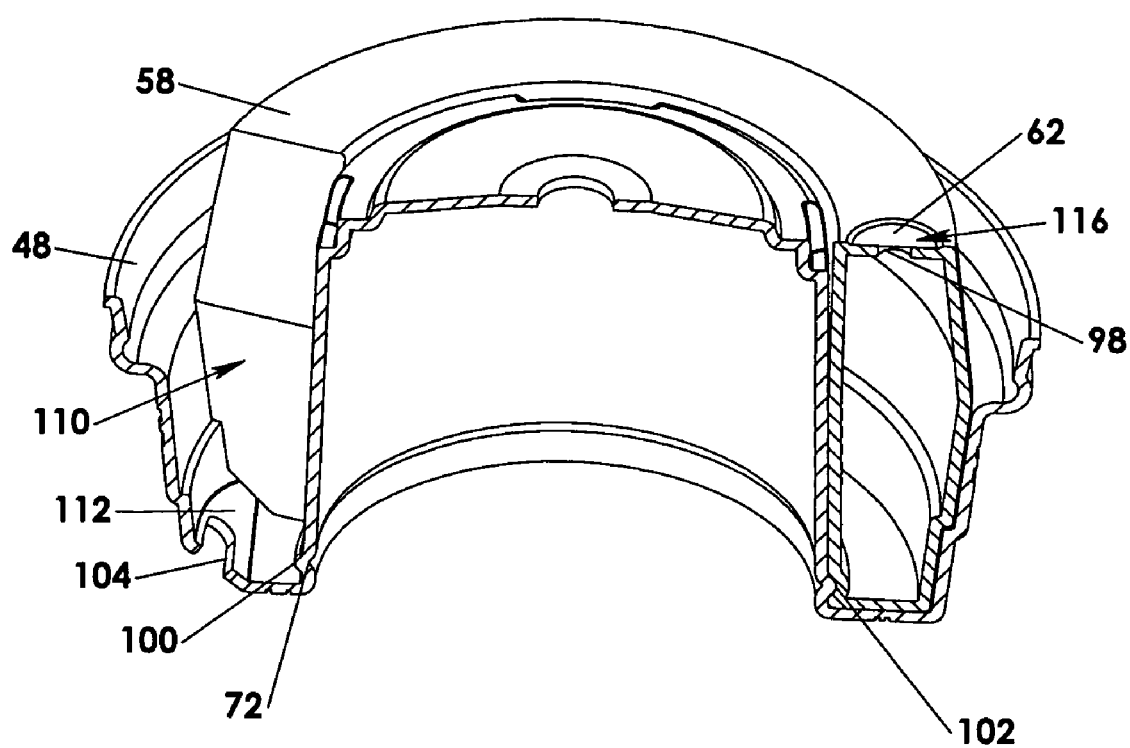
FIG. 16 is a cross-section view of the secondary fluid chamber portion of the first embodiment shown attached to the lid.
Figure 17:
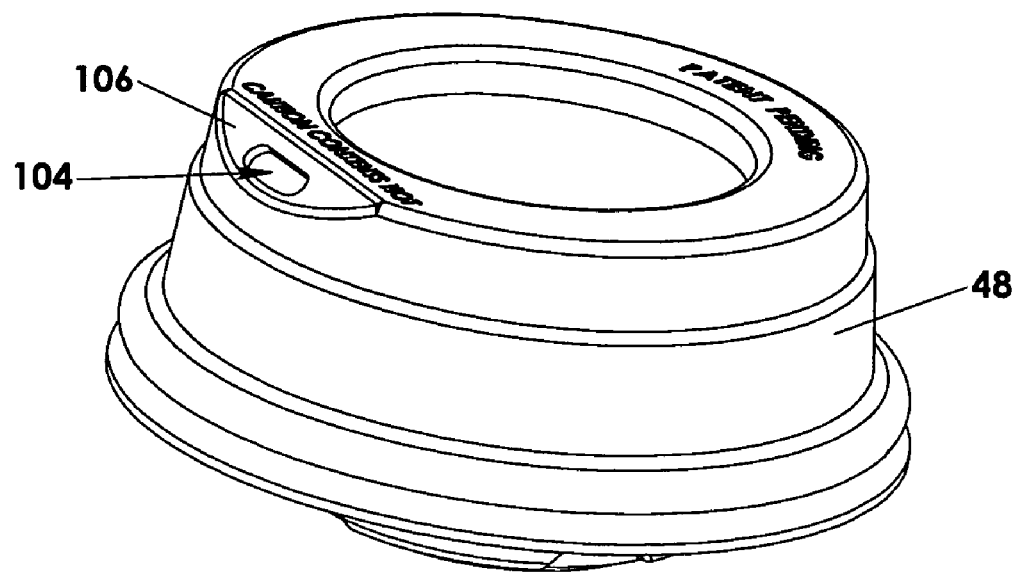
FIG. 17 is a top perspective view of the lid for the first embodiment.
Figure 18:
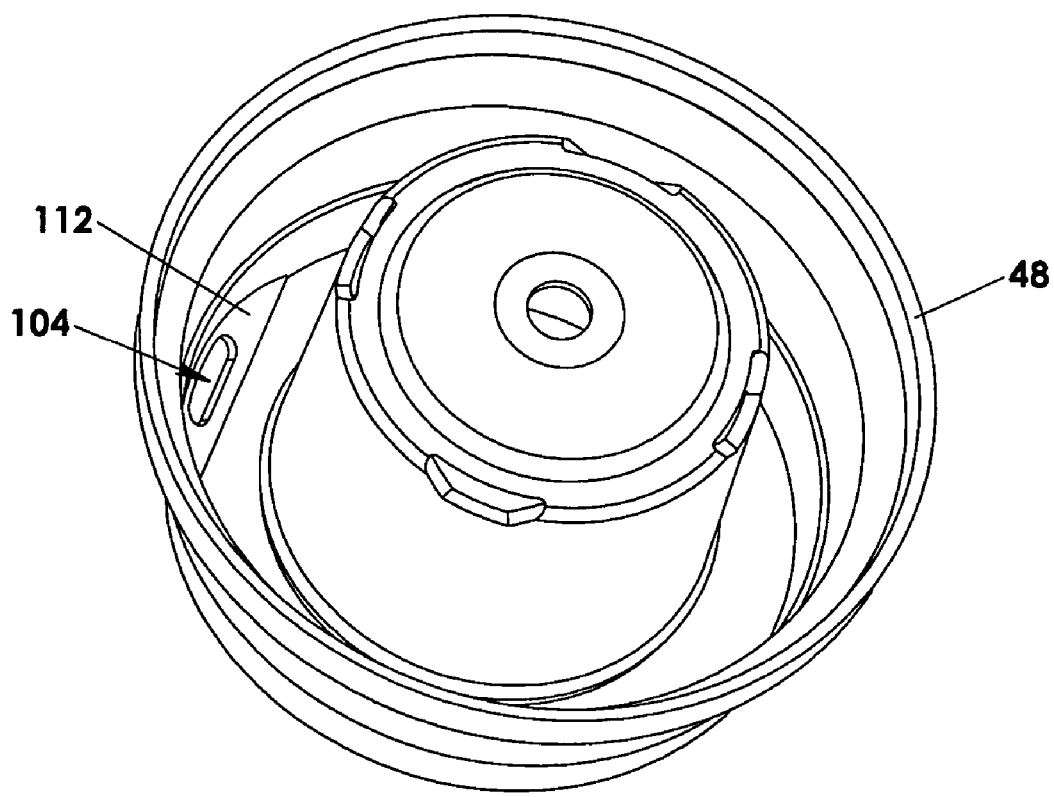
FIG. 18 is a bottom perspective view of the lid for the first embodiment.

Still referring to FIGS. 7-9, and also referring to FIGS. 14-18, the secondary fluid chamber portion 58 and the lid 48 of the first embodiment will be described now in more detail. FIG. 14 is a perspective view of the secondary fluid chamber portion 58 with a portion cut away to illustrate a hole 98 formed therein and a second blow-out valve member 62. FIG. 15 is an enlarged detailed view of the area A in FIG. 14. FIG. 16 is a cross-section view of the secondary fluid chamber portion 58 of the first embodiment shown attached to the lid 48. FIG. 17 is a top perspective view of the lid 48 for the first embodiment. FIG. 18 is a bottom perspective view of the lid 48 for the first embodiment.

As described above and as illustrated in FIG. 6, the first embodiment provides the option of removing the secondary fluid chamber portion 58 prior to the brewing of the beverage (i.e., to choose between having an espresso or a cappuccino). Referring to FIGS. 7-9 and 14-18, the lid 48 of the first embodiment has a tongue 100 formed on its bottom side by the groove 72 formed on its top side. The secondary fluid chamber portion 58 of the first embodiment has a groove 102 corresponding to and adapted to mate with the tongue 100 on the bottom side of the lid 48, as illustrated in FIGS. 7, 8, and 16. Hence, when the secondary fluid chamber portion 58 is installed in the system 30, it may be snapped into place using the tongue-and-groove coupling provided by the tongue 100 of the lid 48 and the groove 102 of the secondary fluid chamber portion 58 fitting together. Also, note that in the first embodiment, the bottom side of the lid 48 is adapted to receive the secondary fluid chamber portion 58 therein when the secondary fluid chamber portion 58 is removably attached thereto.

As shown in FIGS. 17 and 18, the lid 48 of the first embodiment has a sipping hole 104 formed therein on a sloped portion 106. The sipping hole 104 may also act as a vent hole during the brewing process. It is preferred to form the sipping hole 104 on the sloped portion 106 because it provides several advantages and functions. With the sipping hole 104 formed on the sloped portion 106, a person drinking a beverage from the cup 34 having the lid 48 thereon will not need to tilt his/her head back as far to drink the last remaining portions of the brewed fluid 54 in the cup 34, as compared to the sipping hole 104 being placed on a flat top surface of the lid 48 (as in the second embodiment described below). Also, having the sipping hole 104 located on the sloped portion 106 may allow for a more compact brewing configuration (i.e., shorter) because the overhang portion 108 of the bottle portion 36 may be located closer to the flat top surface of lid 48 (see e.g., FIG. 8). This may be useful because it is preferred that the cup interior is not hermetically sealed during the brewing process to allow the brewed fluid 54 to be freely dispensed into the cup 34. Also, it may be useful because it may be preferred to strive to reduce the height of the system 30 in the brewing configuration so that it can fit into a wider variety of microwave ovens (i.e., smaller microwave ovens). However, in other embodiments, the sipping hole 104 may be formed in the lid 48 at another location apart from the sloped portion 106 and/or the sloped portion 106 may be omitted for other embodiments.

As shown in FIG. 14, the secondary fluid chamber portion 58 of the first embodiment has a C-shaped top-view profile forming a gap 110. In the first embodiment, this gap 110 is adapted to be aligned with the sipping hole 104, as shown in FIG. 16. This gap 110 allows the brewed fluid 54 in the cup 34 to freely pass to the sipping hole 104 when the lid 48 is installed along with the secondary fluid chamber portion 58 (see e.g., FIG. 4). If desired, the secondary fluid chamber portion 58 may be removed and discarded after the brewing process.

The sloped portion 106 of the lid 48 (shown in FIG. 17) also forms a ramp extension 112 on the bottom side of the lid 48, as illustrated in FIG. 18. This ramp extension 112 may be used to more easily remove the secondary fluid chamber portion 58 from the lid 48 (e.g., when espresso is desired rather than cappuccino). By rotating the secondary fluid chamber portion 58 relative to the lid 48, the ramp extension 112 of the lid 48 engages against the secondary fluid chamber portion 58 (as the gap 110 moves away from the ramp extension 112). When the ramp extension 112 engages against the secondary fluid chamber portion 58, it causes the secondary fluid chamber portion 58 to move longitudinally relative to the lid 48, which forces the tongue 100 of the lid 48 out of the groove 102 of the secondary fluid chamber portion 58. Such action causes the secondary fluid chamber portion 58 to unsnap from the lid 48, as illustrated in FIG. 6, and thus allowing the secondary fluid chamber portion 58 to be removed from the lid 48. Note that in other embodiments, any of the tongue-and-groove configurations may be reversed and/or replaced with another way of coupling two parts together in a removable manner (e.g., threadedly coupled, interlocking extensions/recesses, fastener, clasp, depressible button in a hole, etc.).

Referring to FIGS. 14 and 15, the hole 98 formed in the secondary fluid chamber portion 58 is covered by the second blow-out valve member 62 so that the secondary fluid chamber portion 58 is initially hermetically sealed in the first embodiment. The second blow-out valve member 62 in the first embodiment is bonded to the secondary fluid chamber portion 58. The second blow-out valve member 62 initially prevents the fluid 59 (e.g., milk) in the secondary fluid chamber portion 58 from exiting the secondary fluid chamber portion 58 via the hole 98 and from entering the cup 34. The second blow-out valve member 62 may be bonded to the secondary fluid chamber portion 58 in any of a variety of suitable ways, including (but not limited to): adhesive, ultrasonic welding, heat, stamped pressure, fused, and combinations thereof, for example. Much like the first blow-out valve member 52, the second blow-out valve member 62 is adapted to be breached at a second predetermined pressure within the secondary fluid chamber portion 58. Thus, as the contents of the secondary fluid chamber portion 58 are heated, the pressure within the secondary fluid chamber portion 58 increases as the temperature of the liquid 59 within the secondary fluid chamber portion 58 increases. Preferably, this second predetermined pressure occurs at a point when the liquid 59 (e.g., milk) inside the secondary fluid chamber portion 58 is at, near, or above its boiling temperature. In the first embodiment, the second blow-out valve member 62 is adapted to at least partially separate from the outside surface of the secondary fluid chamber portion 58 at the second predetermined pressure. In other embodiments, the second blow-out valve member 62 may have a different mechanism for being breached. For example, the second blow-out valve member 62 may be breached by completely separating from the surface of the secondary fluid chamber portion 58 (although this is probably not preferred unless there is a means for preventing the second blow-out valve member 62 from entering the brewed fluid 54 in the cup 34). In yet another example, the second blow-out valve member 62 may be breached by developing a breach hole and/or a tear in the second blow-out valve member 62 using the pressure of the contents of the secondary fluid chamber portion 58. In another embodiment, the second blow-out valve member 62 may be weakened by the increased temperature. In still another embodiment, the second blow-out valve member 62 may be melted or fused by the temperature of the contents in the secondary fluid chamber portion 58 and/or the temperature of the second blow-out valve member 62 itself from the heating process (e.g., heating in microwave oven). The breaching mechanism will likely depend on the material composition of the second blow-out valve member 62 and/or the strength of the bond between the second blow-out valve member 62 and the secondary fluid chamber portion 58.

Still referring to FIGS. 14 and 15, a recess 116 is formed on an outside of the secondary fluid chamber portion 58 in the first embodiment. The hole 98 is formed in the recess 116 and the second blow-out valve member 62 is formed over the hole 98 within the recess 116 for the first embodiment. In other embodiments, the recess 116 may be deeper or more shallow. Also, the recess 116 may be omitted in other embodiments. The presence of the recess 116 and/or the depth of the recess 116 may effect the amount of milk foam or froth formed in a cappuccino, for example. In a brewing configuration for the first embodiment, the recess 116 opens downward. After the second blow-out valve member 62 is breached, most of the liquid 59 from the secondary fluid chamber portion 58 is dispensed via the hole 98. Due to the recess 116 and the location of the hole 98 within the recess 116, part of the liquid 59 remains in the secondary fluid chamber portion 58 during the brewing process. This remaining liquid may then be boiled within the secondary fluid chamber portion 58. If the liquid 59 is milk, for example, the remaining milk may be boiled in the secondary fluid chamber portion 58 to form milk foam, which is dispensed into the cup 34 via the hole 98. In another embodiment where there is no recess however, there may still be a formation of milk foam (or boiling of the milk) within the secondary fluid chamber portion 58 (e.g., prior to or after the breaching of the second blow-out valve member 62). The second predetermined pressure at which the second blow-out valve 62 is breached may be adjusted (by design) and/or the amount of air space provided in the secondary fluid chamber portion 58 for forming the milk foam within the secondary fluid chamber portion 58 may be adjusted (by design), for example. Thus, a milk foam may be formed with or without the recess 116.

Figures 19A, 20A:
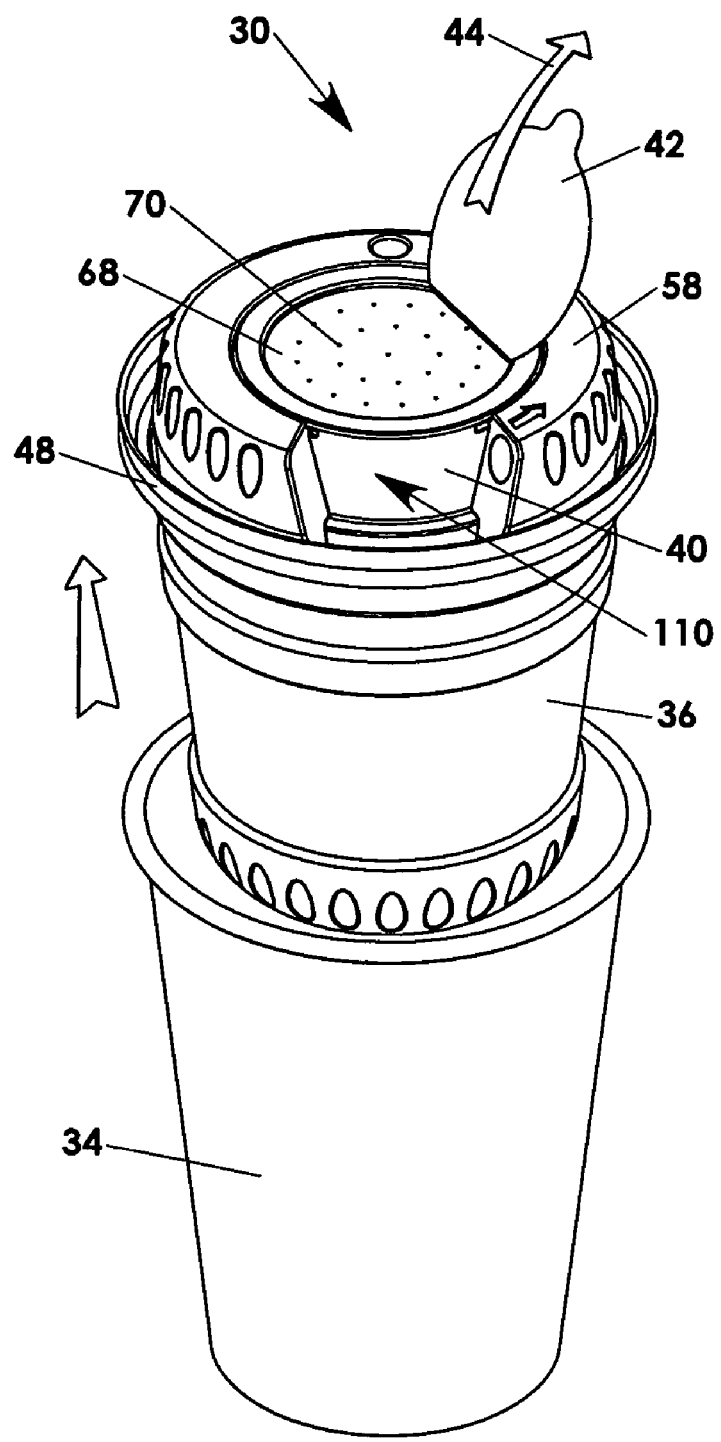
FIGS. 19A-19C illustrate various configurations of a second illustrative embodiment of the present invention.
FIGS. 20A-20D illustrate some alternative configuration of the second embodiment.
Figure 19B:
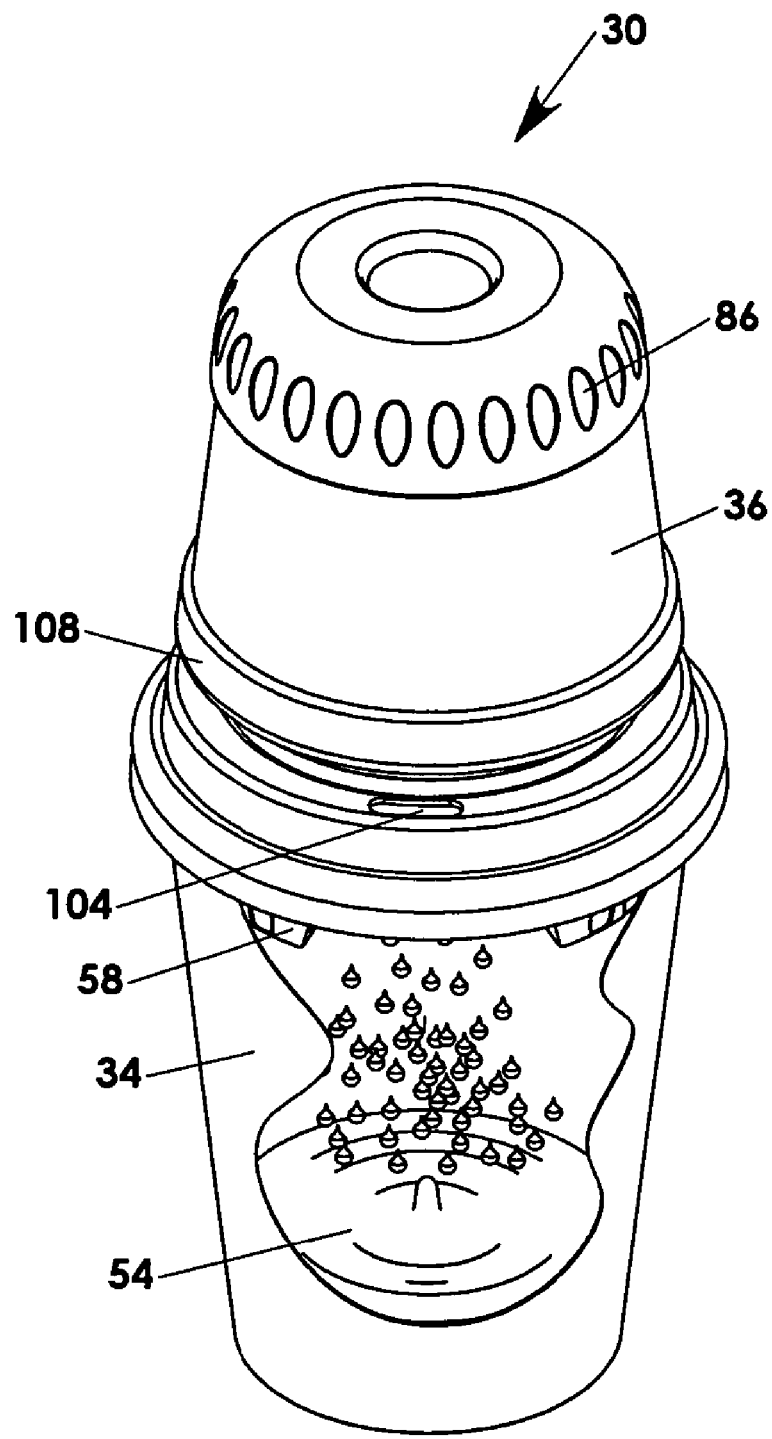
Figures 19C, 20D:
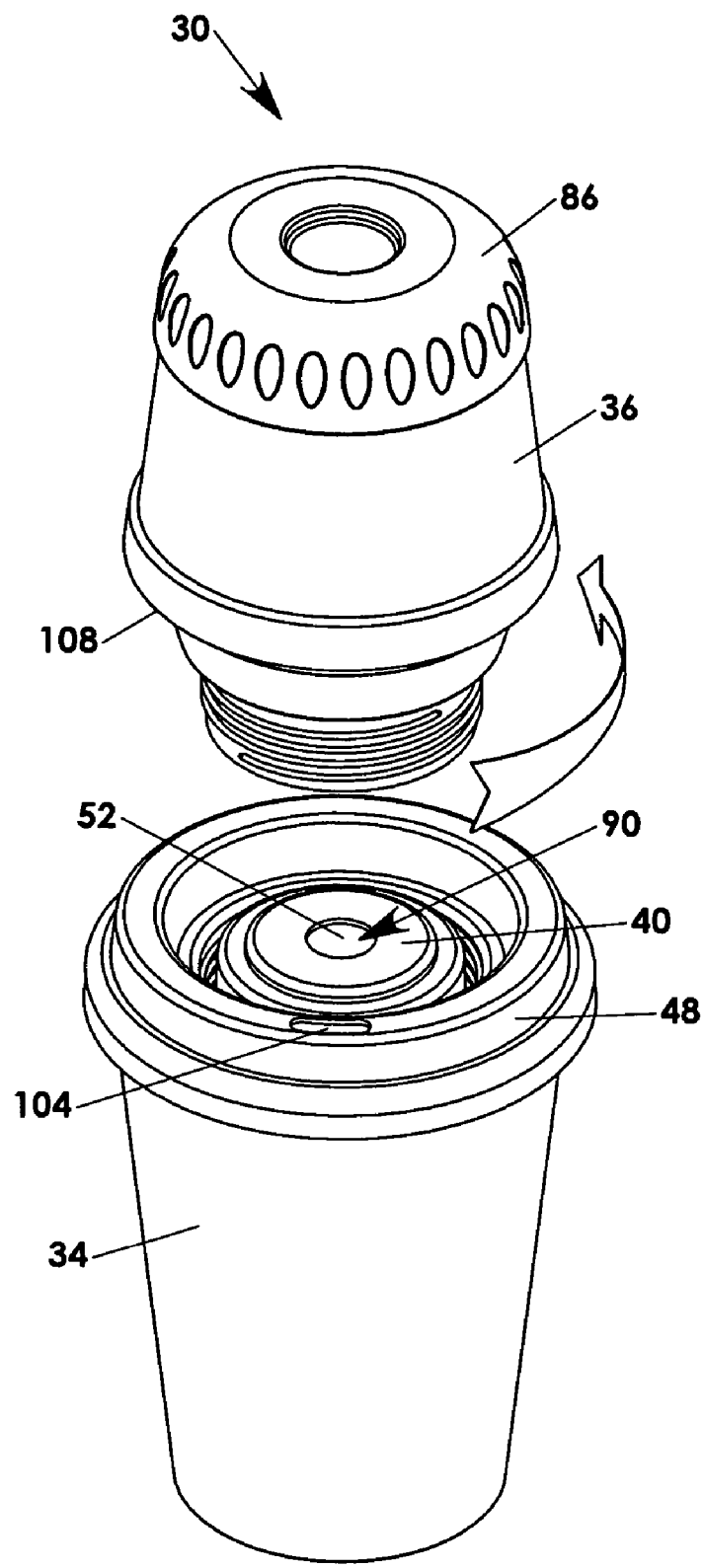
Figure 20B:
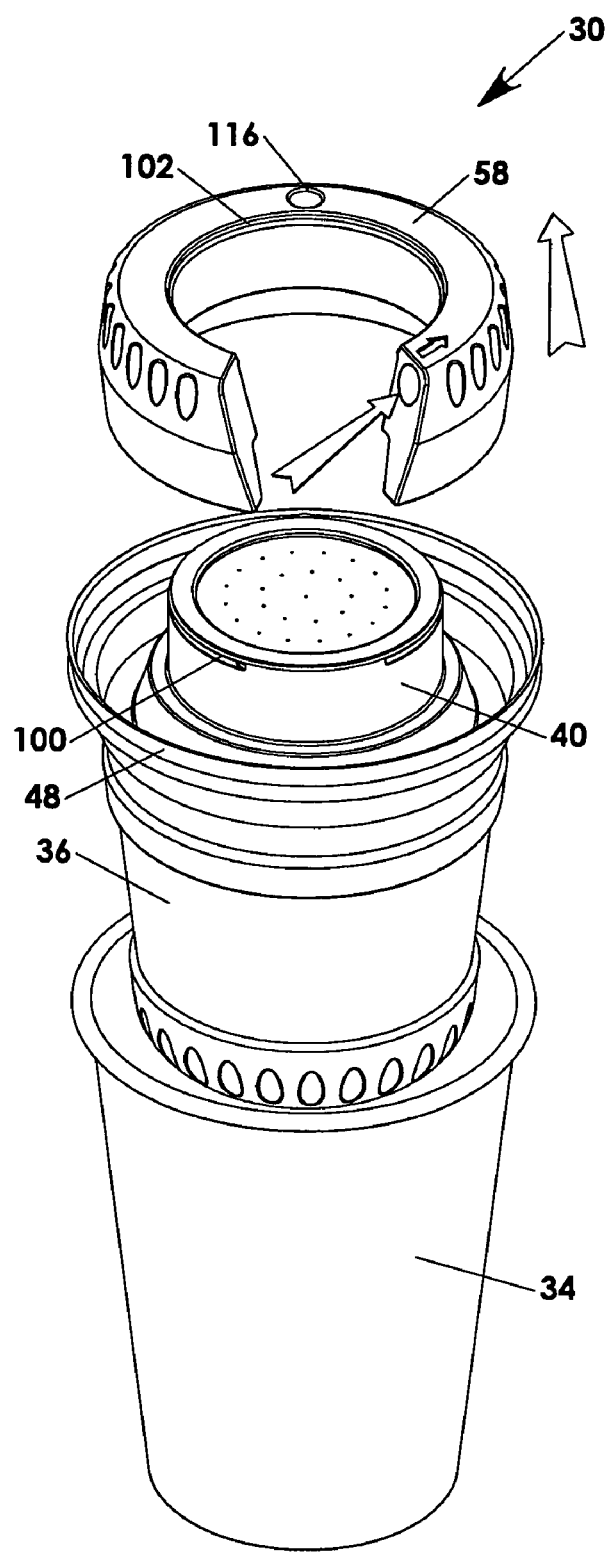
Figure 20C:
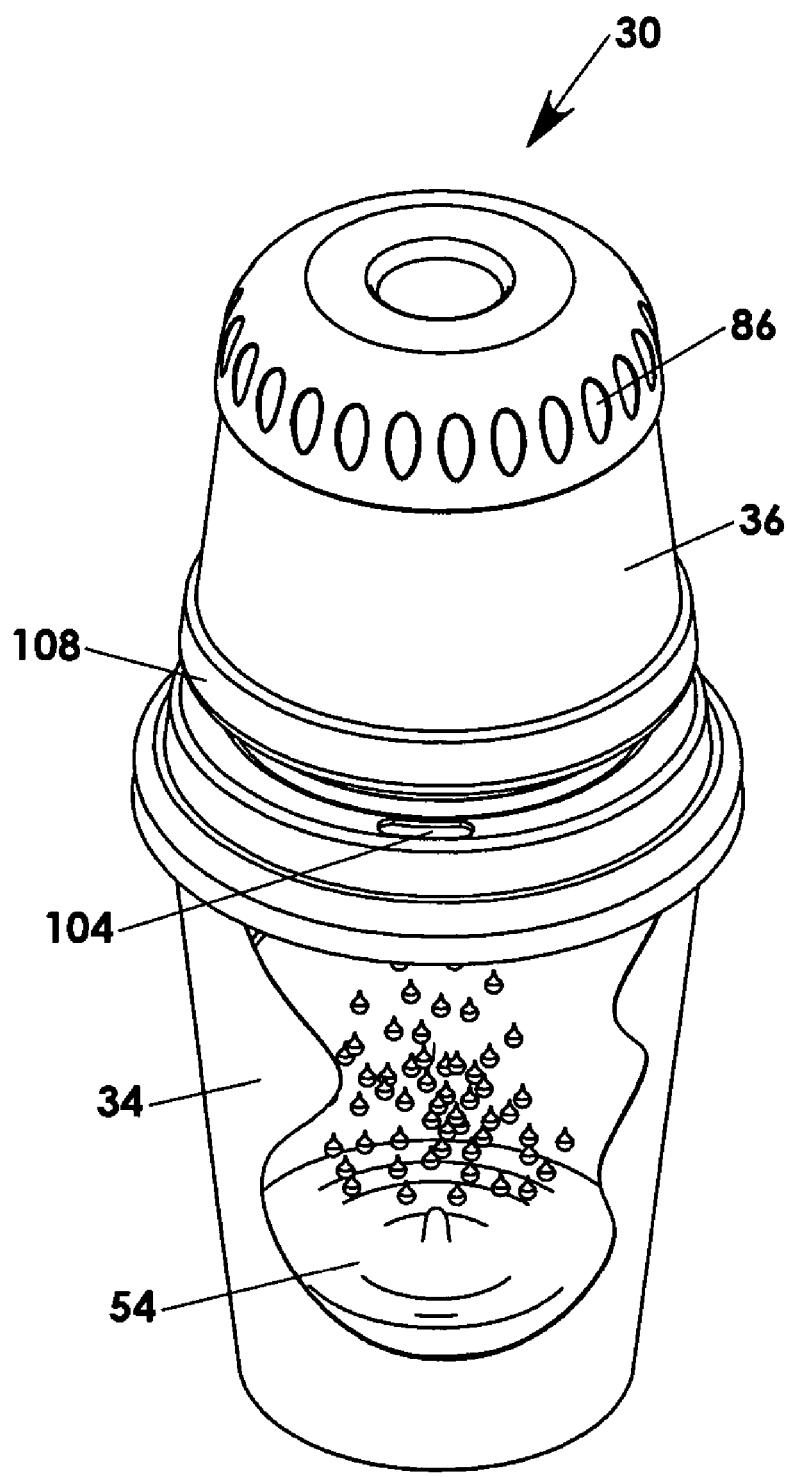
Figure 21:
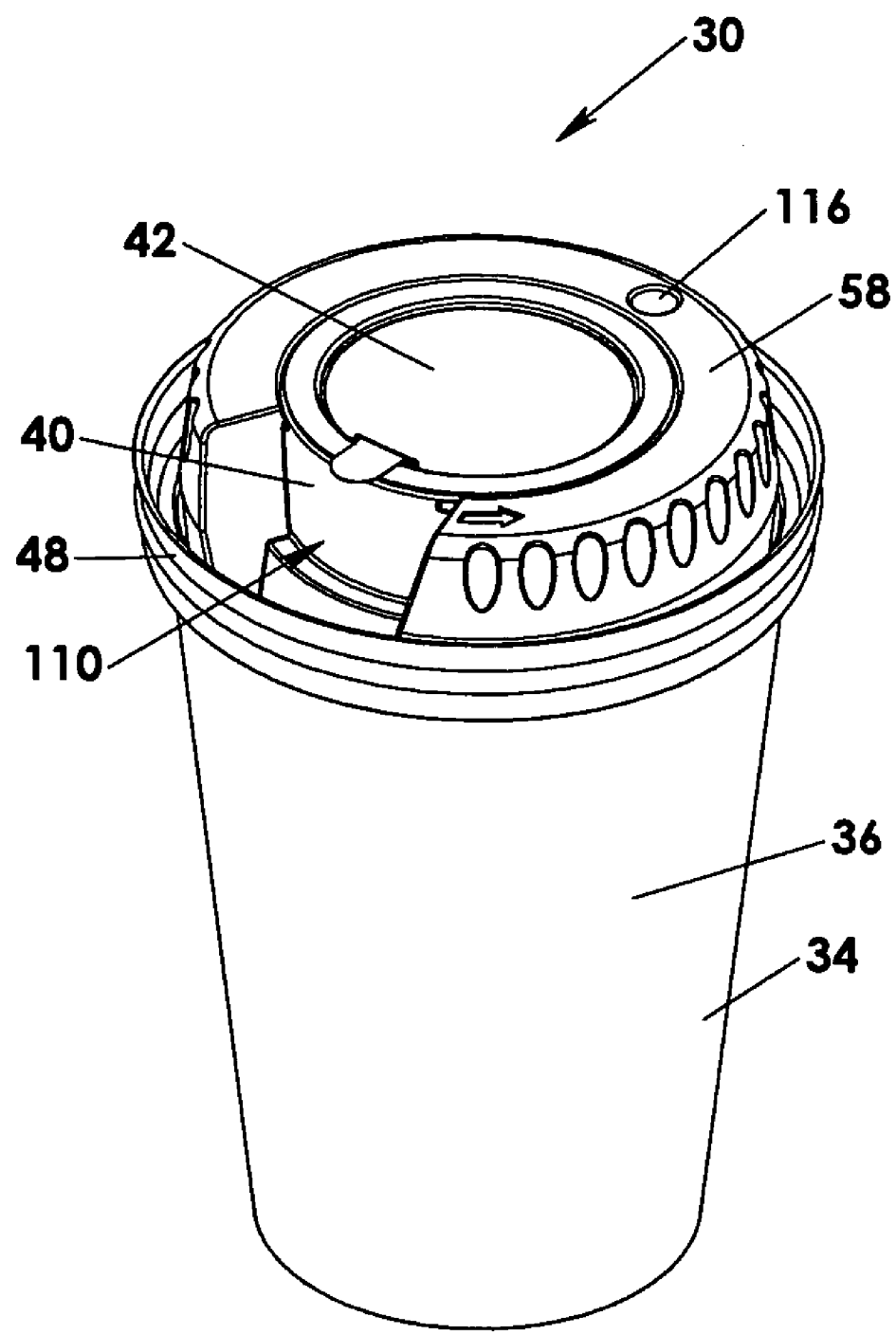
FIG. 21 is a perspective view of the second embodiment in a storage configuration with a portion of the cup cut away.
Figure 22:
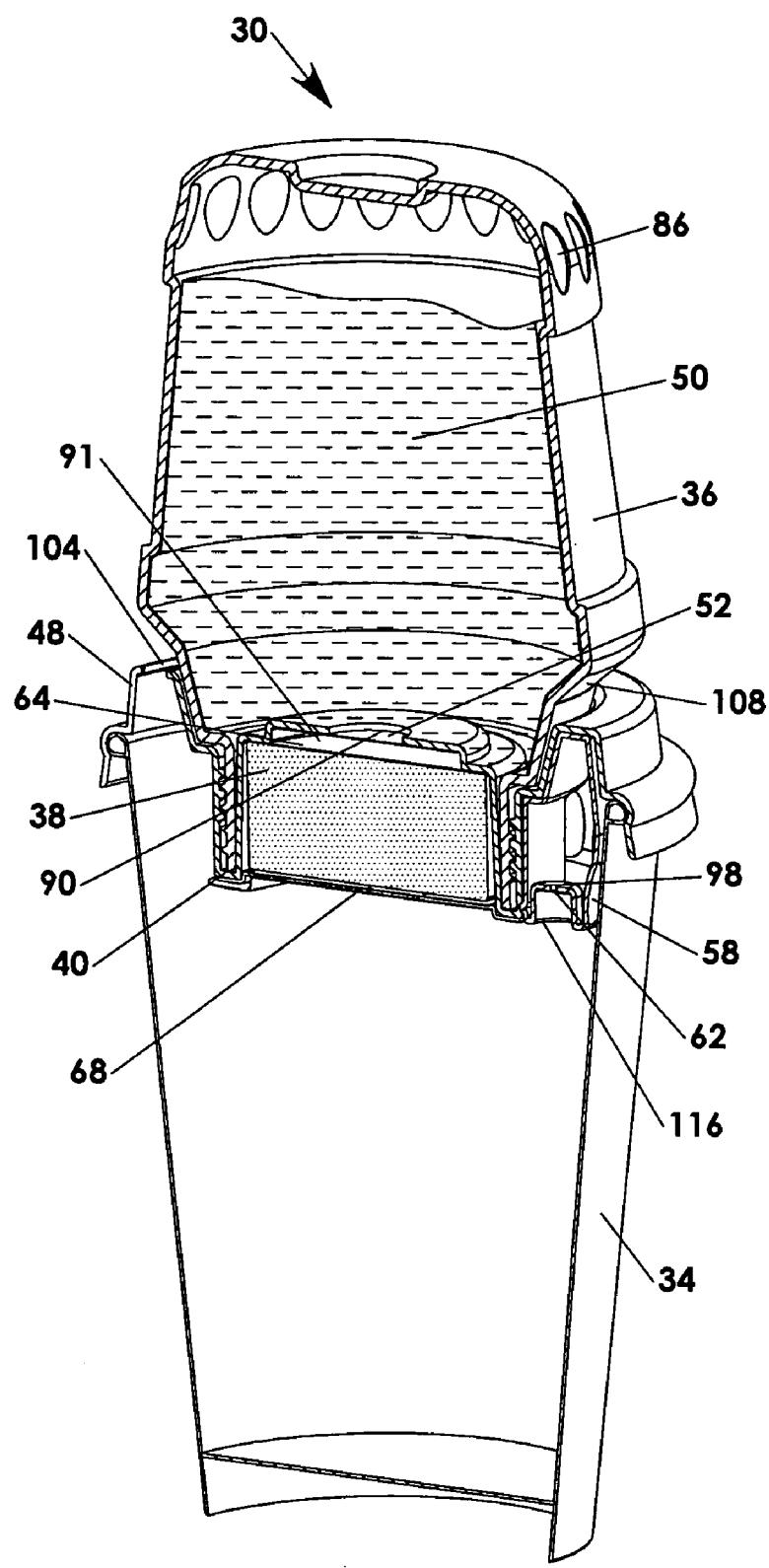
FIG. 22 is a cross-section view for the system of the second embodiment in a brewing configuration.
Figure 23:
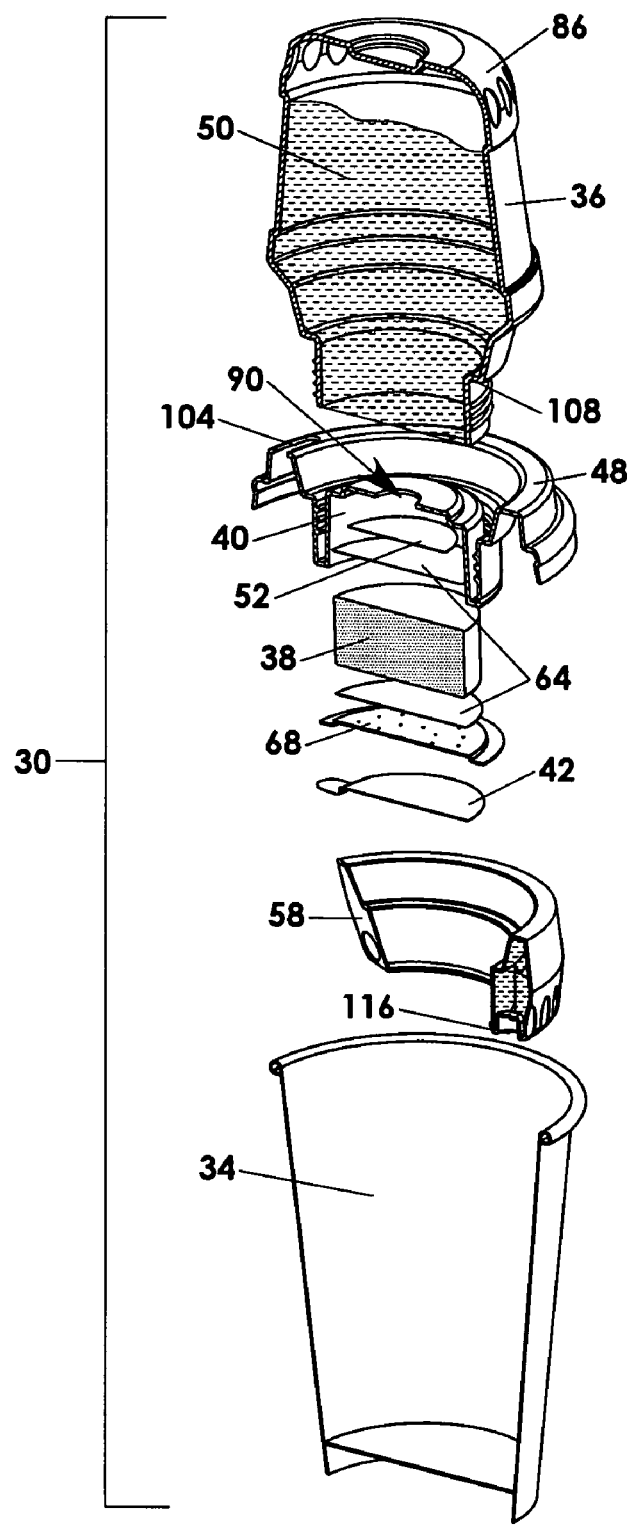
FIG. 23 is an exploded cross-section view for the system of the second embodiment.

FIGS. 19A-23 illustrate various configurations and uses of a second illustrative embodiment of the present invention. FIGS. 19A-19C illustrate a use of the second embodiment to provide a cup of cappuccino. FIGS. 20A-20D illustrate a used of the second embodiment to provide a cup of espresso. FIG. 21 is a perspective view of the second embodiment in a storage configuration. A portion of the cup 34 has been cut away in FIG. 21 to illustrate the bottle portion 36 therein. FIG. 22 is a cross-section view for the system 30 of the second embodiment in a brewing configuration. FIG. 23 is an exploded cross-section view for the system 30 of the second embodiment to better illustrate some of the components of the system 30.

In the second embodiment, the brewing chamber portion 40 is an integral part of the lid 48, and the bottle portion 36 is a separate component. In other embodiments of the present invention, the lid 48, the brewing chamber portion 40, and the bottle portion 36 may all be separate or separable components. Preferably, the cover 68 for the brewing chamber portion 40 is permanently attached to the brewing chamber portion 40 or the lid 48 after the brewing substance 38 has been operably installed. It may be preferred to permanently bond the cover 68 over the brewing chamber portion 40 to be part of the brewing chamber portion 40 and/or to hinder or prevent a user from attempting to reuse the system 30, especially if the system 30 is designed to be a one-time-use, disposable system.

FIG. 21 shows the beverage brewing system 30 in the storage configuration. As in the first embodiment, the brewing ingredients (e.g., water 50, milk 59, ground coffee beans 38) for the system 30 are preferably provided in the system 30 initially in the second embodiment. Also, the second embodiment is adapted to have a compact storage configuration. A freshness seal 42 is provided over the brewing chamber portion 40 in the storage configuration, as shown in FIG. 21. The bottle portion 36, the lid 48, the secondary fluid chamber portion 58, and the brewing chamber portion 40 are preferably operably assembled together and form a unit in the storage configuration, as shown in FIG. 21, to allow for a quick and easy conversion to the brewing configuration.

FIG. 19A shows the freshness seal 42 being removed to expose the drip holes 70, which are formed in the brewing chamber portion 40 and open to the brewing substance 38 (e.g., ground coffee beans) in the brewing chamber portion 40. Also, FIG. 19A shows the lifting of the unit from the cup 34, which is simply turned over to form the brewing configuration shown in FIGS. 19B and 22. As in the first embodiment, the bottle portion 36 is hermetically sealed and the fluid 50 in the bottle portion 36 is hindered from passing to the brewing chamber portion 40 via a first hole 90 by a first blow-out valve member 52. The first blow-out valve member 52 is preferably adapted to be breached at a first predetermined pressure in the second embodiment, as described above regarding the first embodiment. The system 30 may be heated in a microwave oven, for example, to initiate the brewing process for producing the brewed fluid 54, which is dispensed into the cup 34 as illustrated in FIG. 19B. Also, because the secondary fluid chamber portion 58 is left in place in the brewing configuration shown in FIGS. 19B and 22, the liquid 59 in the secondary fluid chamber portion 58 is preferably dispensed into the cup 34 as well during the brewing process (again as described above regarding the first embodiment). After the brewed fluid 54 is formed in the cup 34, the bottle portion 36 may be removed from the lid 48, as shown in FIG. 19C, to form a drinking configuration. In the second embodiment, the bottle portion 36 is adapted to be unscrewed from lid 48, as illustrated in FIG. 19C.

FIGS. 20A-20D illustrate a process of making espresso using the system 30 of the second embodiment. As illustrated in FIG. 20B, the secondary fluid chamber portion 58 may be removed from the lid 48 to prevent the addition of the milk to the espresso 54 that is brewed in the brewing chamber portion 40. As described above regarding the first embodiment, the secondary fluid chamber portion 58 may be unsnapped and removed by rotating the secondary fluid chamber portion 58 relative to the lid 48 to engage a ramp extension 112 protruding from a bottom surface of the lid 48.

Referring to FIG. 23, it is preferred to include one or more filter elements 64 in the brewing chamber portion 40. After removal of the bottle portion 36 (see e.g., FIGS. 19C and 20D), the first hole 90 is exposed, which thereby exposes the contents of the brewing chamber portion 40 via the first hole 90. A filter element 64 between the first hole 90 and the brewing substance may be desired to prevent the brewing substance 38 from exiting the brewing chamber portion while drinking from the cup 34 via the lid 48 (via sipping hole 104 formed in lid 48). An advantage of leaving the brewing chamber portion 40 in place in the drinking configuration is that the drinker's nose will receive an intense smell of the brewing substance 38 via the first hole 90 while drinking from the cup 34 via the lid 48, as the user's nose will be right over the first hole 90. However, an advantage of the first embodiment is that the removal of the brewing chamber portion 40 from the lid 48 to form a drinking configuration provides more clearance in the center of the lid 48 for a person's nose (see e.g., FIGS. 5 and 17) while tilting the cup 34 back for drinking. Another advantage of removing the bottle portion 36 and the brewing chamber portion 40 (e.g, as is possible with the first embodiment) is that the system 30 is not so top heavy in the drinking configuration, especially when there is little of the brewed drink 54 remaining in the cup 34. In another embodiment where the brewing chamber portion 40 is a separate and removable component, the user may be provided with the option of whether to remove the brewing chamber portion 40 or not (i.e., with or without the bottle portion 36).

In still another embodiment (not shown) of the present invention, the secondary fluid chamber portion 58 may be an integral part of the lid 48 and/or some other part of the system 30. However, in such embodiment, the user may not have the option to remove the secondary fluid chamber portion 58. The liquid 59 and/or other substance(s) placed in the secondary fluid chamber portion 58 may vary for other embodiments. For example, the secondary fluid chamber portion 58 may include a flavoring or added ingredient, such as (but not limited to): chocolate, cinnamon, nutmeg, salt, sugar, fruit juice, fruit, syrup, caramel, sauce, artificial flavors, natural flavors, and combinations thereof, for example. Thus, the flavor of a coffee drink may be altered by simply altering or changing the secondary fluid chamber portion 58. It is contemplated that the secondary fluid chamber portion 58 may be sold separately to allow a consumer to choose what flavors he/she wants, as a part of a modular kit for a system 30 of an embodiment. Thus, there may be some embodiments where no secondary fluid chamber portion 58 is included with the system 30. Still other embodiments may not have a secondary fluid chamber portion 58 and may not be adapted to receive or use a secondary fluid chamber portion 58. On the other side of that spectrum, an embodiment of the present invention may have or may be adapted to receive/use multiple secondary fluid chamber portions 58 for providing multiple secondary fluids in the brewed drink.

Although the first and second illustrative embodiments have been described in the context of being adapted to provide a fresh brewed cappuccino or espresso drink, an embodiment of the present invention may be adapted to provide other drinks or brewed fluids as well. For example, the brewing substance 38 may be any of a wide variety of possible substances, including (but not limited to): tea leafs, tea concentrate, instant tea, instant coffee, flavored coffee, fruit, herb, sugar, an artificial sweetener, a dehydrated edible substance, a dehydrated milk product, a soy product, a rice product, dehydrated milk, dehydrated cream, a concentrated edible substance, a concentrated drink mix, an instant drink mix, and combinations thereof. Similarly, the contents of the secondary fluid chamber portion(s) 58 (if present) may vary for other embodiments, and such contents may include (but are not limited to): flavored liquid (e.g., mocha, hazelnut, irish cream, amaretto, french vanilla, white chocolate, nutmeg, cinnamon), fruit, fruit juice, herb, seasoning, alcohol, sugar, an artificial sweetener, syrup, sauce, caramel, chocolate, cocoa, honey, vitamins, vanilla, a milk product, a soy product, a rice product, cream, yogurt, a concentrated drink mix, an instant drink mix, and combinations thereof. Likewise, the fluid provided in the bottle portion 36 may vary for other embodiments. With the benefit of this disclosure, one of ordinary skill in the art will likely realize other ingredients, substances, and/or liquids that may be incorporated and/or used in an embodiment of the present invention.

As mentioned above, it is preferred that an embodiment of the present invention is disposable, inexpensive, microwavable, and designed for a single use. In a preferred embodiment, the lid 48, the bottle portion 36, and the brewing chamber portion 40 are made from a molded plastic material. The lid 48, the brewing chamber portion 40, and the bottle portion 36, each may be made from material such as (but not limited to): recyclable plastic, at least partially recycled plastic, polypropylene, polyethylene, polycarbonate, paper, waxed paper, polystyrene, and combinations thereof, for example. For the lid 48, the brewing chamber portion 40, and/or the bottle portion 36, some or all of these components may be made from a same material, or they may be made from different materials. The first and second blow-out valve members 52, 62 may be made from any of a variety of suitable materials for a given design of an embodiment. For example, the first blow-out valve member 52 may be made from plastic. In a preferred embodiment, one or more of the key components of the system 30 may be adapted to become deformed during or after the brewing process to hinder reuse of the system 30. Also, the different components may have same or different colors, even when made from a same material type. The cup 34 may be made from any of a variety of known or later developed structures and materials, such as (but not limited to): plastic, paper, polystyrene, or waxed paper, and may be shrink-wrapped with foam and/or plastic to provide thermal insulation and/or graphics. Also, some or all of the components for a system of an embodiment may have logos and/or graphics included thereon. For example, graphics and/or logos may be included in or on the permanently-attached sleeve 49 (see e.g., FIGS. 1, 2, and 9).

An embodiment of the present invention provides numerous advantages. One advantage of an embodiment of the present invention is that a beverage brewing system of an embodiment may be purchased at a store (e.g., grocery store), stored in a user's home, and prepared at anytime using a microwave oven, for example, in the comfort of the user's home. Hence, the user need not drive to a coffee shop to obtain a fresh brewed coffee drink, for example. Another advantage is that an embodiment may be self-contained, easy to use, and/or disposable. Thus, preparation time may be short (e.g., two minutes in a microwave) and there is no messy equipment or machines to clean or wash after the preparation.

Furthermore, an embodiment preferably provides a portable and disposable package in the storage configuration and in the drinking configuration. For example, a user may put the system 30 in the microwave oven (in the brewing configuration) to prepare the beverage. Then, the user may remove the bottle portion 36 (and the brewing chamber portion 40 in some cases) to form the drinking configuration, which is ready to be carried (e.g., in a car or while walking) with its spill-resistant lid 48 in place.

Another advantage of an embodiment of the present invention may be the ability to stack, store, and/or shelve a beverage brewing system 30 of an embodiment (in a packaged and/or storage configuration) in a space efficient manner. Vendors and stores typically prefer and desire products having a minimized footprint area and that minimize the shelving space needed for the product. Because an embodiment of the present invention uses pressure in the bottle portion 36 to breach the first blow-out valve 52, it is preferred and will often be necessary to have a rigid bottle portion 36 (rather than a pliable or collapsible bottle). Thus, an embodiment of the present invention in a storage configuration preferably has the bottle portion located inside the cup 34 (see e.g., FIGS. 1-3, 7, 19A, 21). Otherwise, if the system 30 were packaged in a storage configuration having the bottle portion 36 located outside of the cup 34 (e.g., next to the cup or stacked above the cup), this may double or nearly double the shelf space required for the system 30 in a packaged or storage configuration. Also, providing an embodiment with the bottle portion 36 located within the cup 34 in the packaged/storage configuration will likely be preferred for use in vending machines (as described further below regarding FIG. 24).

Figure 24:
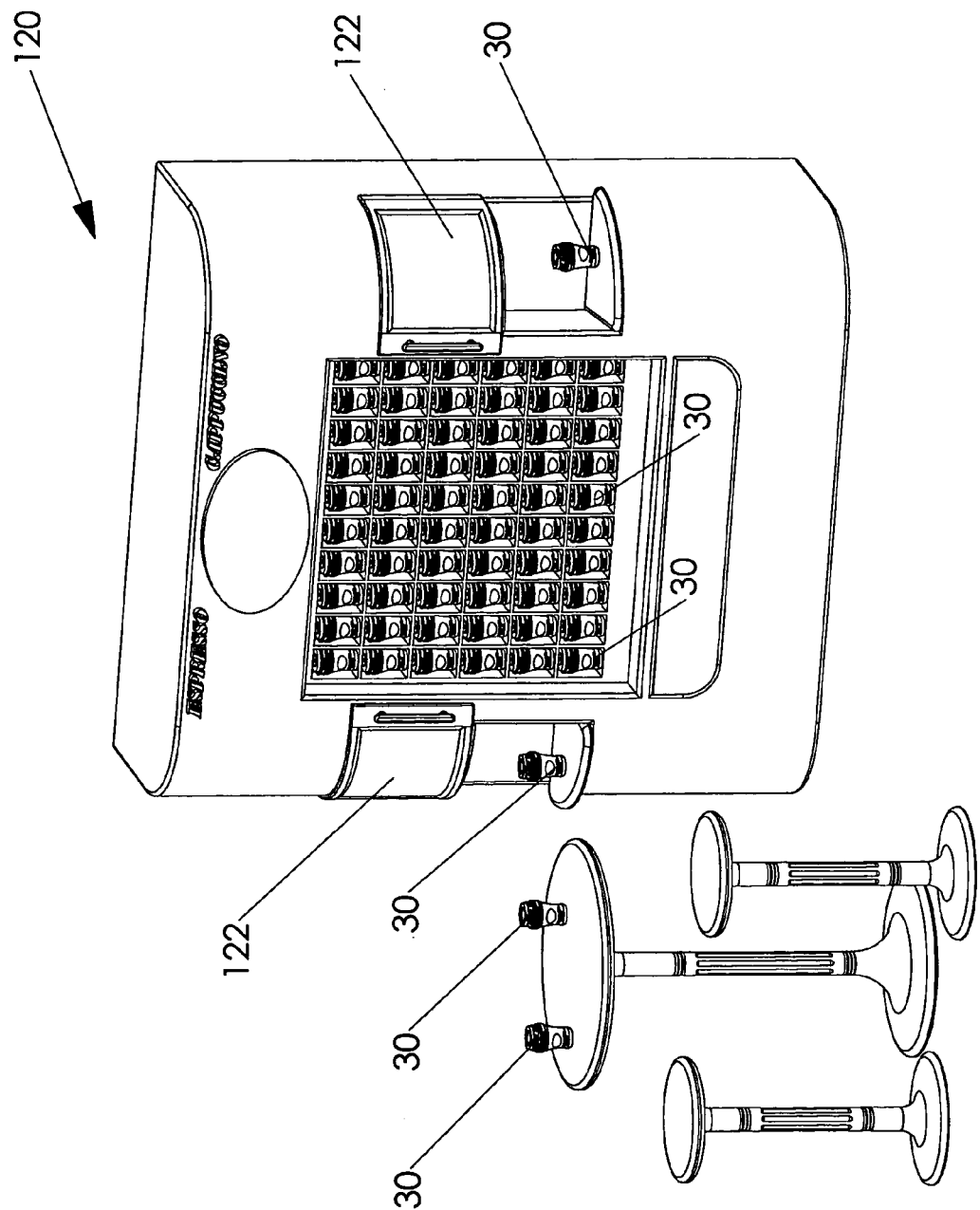
FIG. 24 illustrates a vending machine setting adapted to distribute, prepare, and serve a brewed beverage in accordance with an embodiment of the present invention.

Yet another advantage of an embodiment is that it may be sold or distributed in a variety of locations, with or without the need for a salesperson. For example, an embodiment of the present invention may be sold from a vending machine 120, as illustrated in FIG. 24. Such vending machines 120 may be placed in a wide variety of places to reach a larger market of people than most coffee shops are able to do. Also, the cost of providing a fresh brewed drink from a vending machine 120 may be much less than that of a coffee shop because there are no employees needed to prepare, sell, and serve the drinks to customers. A vending machine 120 also consumes much less space than a coffee shop because there is not a need for sales counters, sinks, and expensive coffee machines. The vending system 120 may include user-friendly microwave ovens 122 for heating the system 30, as illustrated in FIG. 24. A vending machine 120 may provide a wide variety of beverage choices and flavor selections. For example, such a vending machine 120 may be placed in an airport terminal, in a hotel, in a stadium, on a college campus, in an office building, in a convenience store, in a grocery store, in a movie theater, in a theme park, in a repair shop, or at another place where vending machines are commonly found.

An embodiment of the present invention could even be ordered over the internet and delivered directly to a person's home or business via mail or parcel delivery service, for example. An embodiment of the present invention also may be sold in convenience stores to compete with the coffee shops. Furthermore, an embodiment of the present invention may be packaged and marketed to provide a same level of style and branding that many coffee shops offer, while also providing a product with a similar or equal level of quality. An embodiment may provide a high quality drink in a stylish manner, while still being inexpensive relative to a same drink purchased at a coffee shop. An embodiment of the present invention is preferably sized to fit into most standard size microwave ovens in the brewing configuration. An advantage of the first embodiment (see e.g., FIG. 5) is that the lid 48 is flush with the outside of the cup 34 to eliminate the lid overhang that most cup/lid combinations have. Such lid overhangs, which are common on disposable cup/lid combinations, often cause the lid to be partially or completely removed by accident. This often leads to a spilled drink and/or a mess. In a preferred embodiment, the cup 34 includes a built-in insulation jacket 49 (see FIG. 9) that is permanently attached to the cup 34, and thus eliminates the need for an additional external paper insulation sleeve. With the benefit of this disclosure, one of ordinary skill in the art will likely realize many other advantages and/or uses of an embodiment of the present invention.

Figure 25:
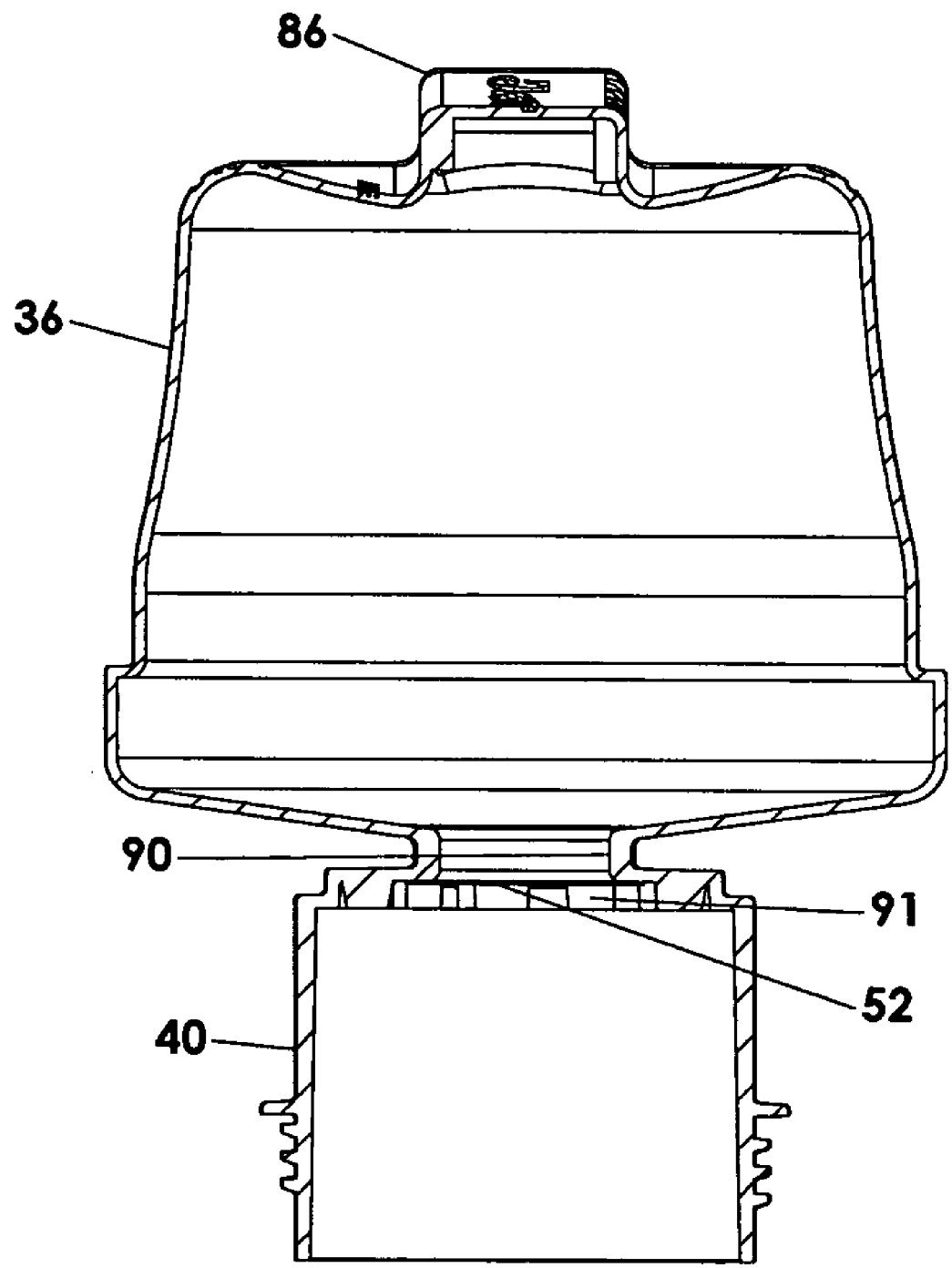
FIGS. 25-31 show various views and components for a third embodiment of the present invention.

FIGS. 25-31 show various views and components for a third embodiment of the present invention. FIG. 25 is a cross-section view showing a bottle portion 36 and a brewing chamber portion 40 of the third embodiment. These components 36, 40 are similar to that of the first embodiment, except that the opening for the first hole 90 is larger. Providing a larger opening for the first hole 90 increases the area of the first blow-out valve 52 being pressed against by the contents of the bottle portion 36 during heating. Given the same pressure, an increase in the area of the first blow-out valve 52 on which that pressure is exerted will increase the force applied to the first blow-out valve 52 (F=PA, where F is force, P is pressure, and A is area). Increasing the force exerted on the first blow-out valve 52 during heating may allow the seal formed by the first blow-out valve 52 to be stronger and/or may allow the first blow-out valve 52 to be breached sooner. Thus, it may be desired in some cases to have a larger first hole 90, and this feature may be included in any embodiment of the present invention.

Figure 26:
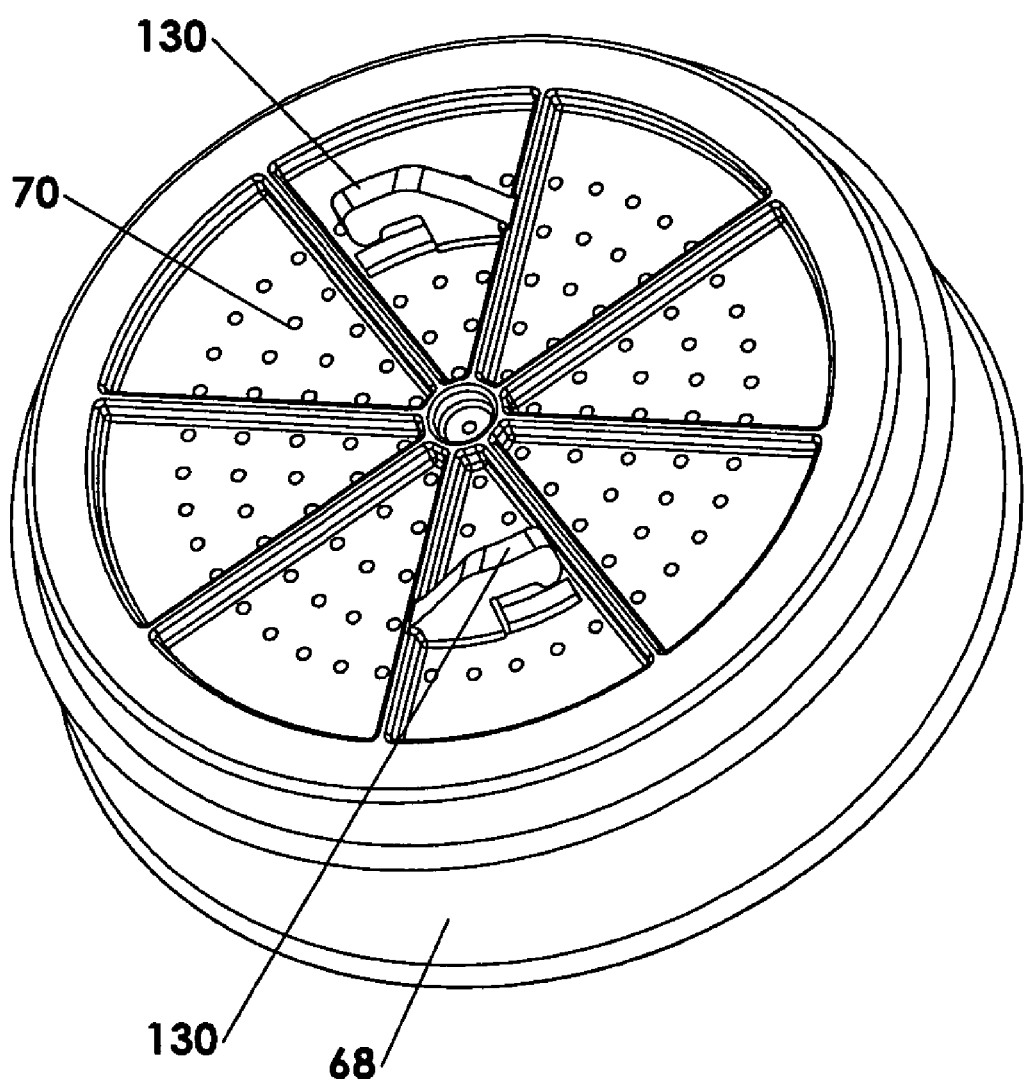
Figure 27:
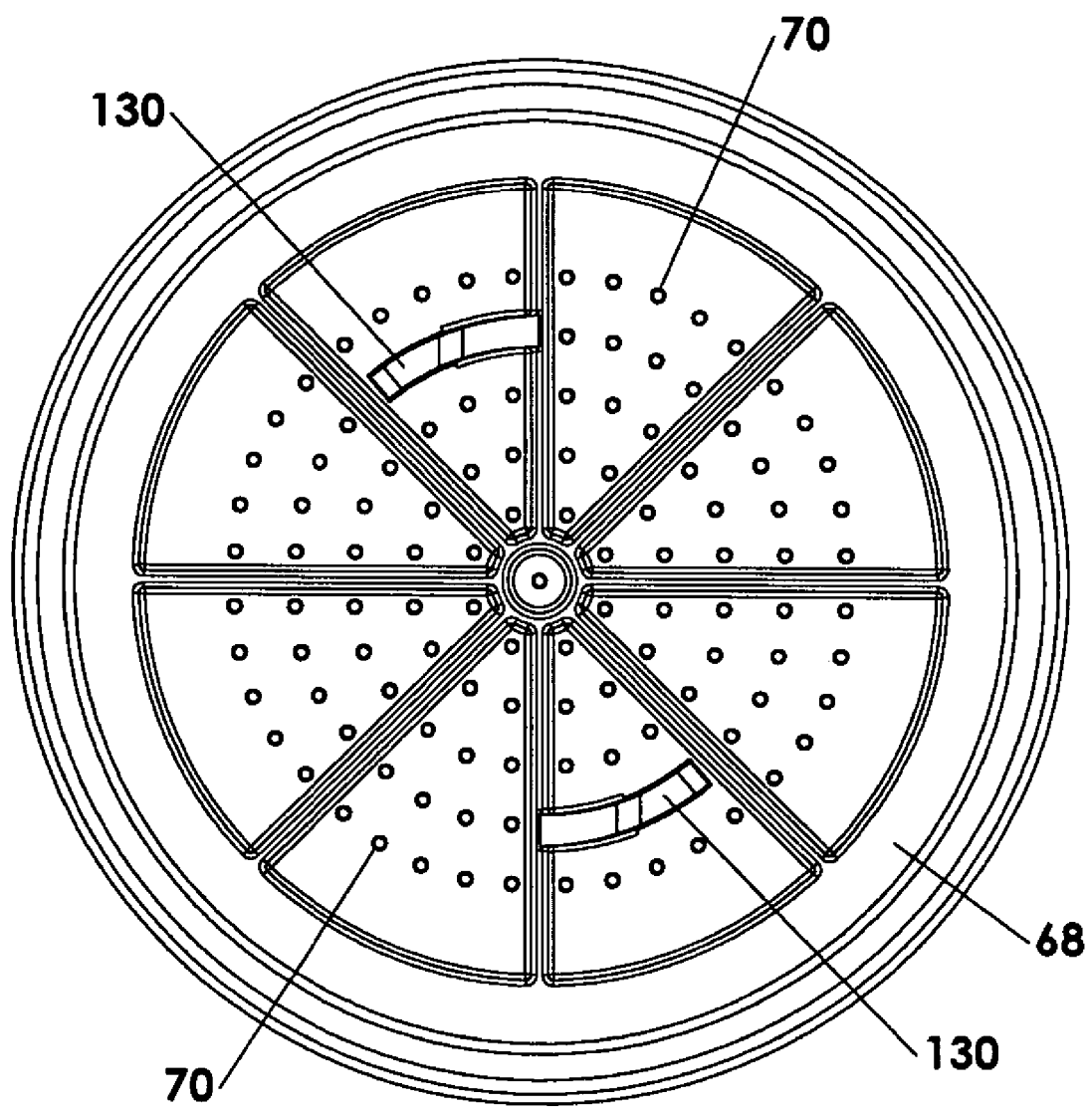
Figure 28:
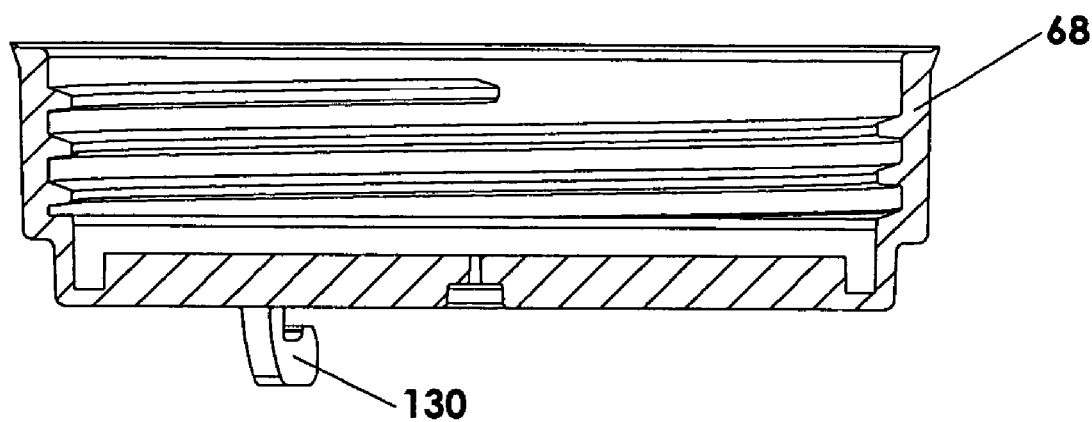
Figure 29:
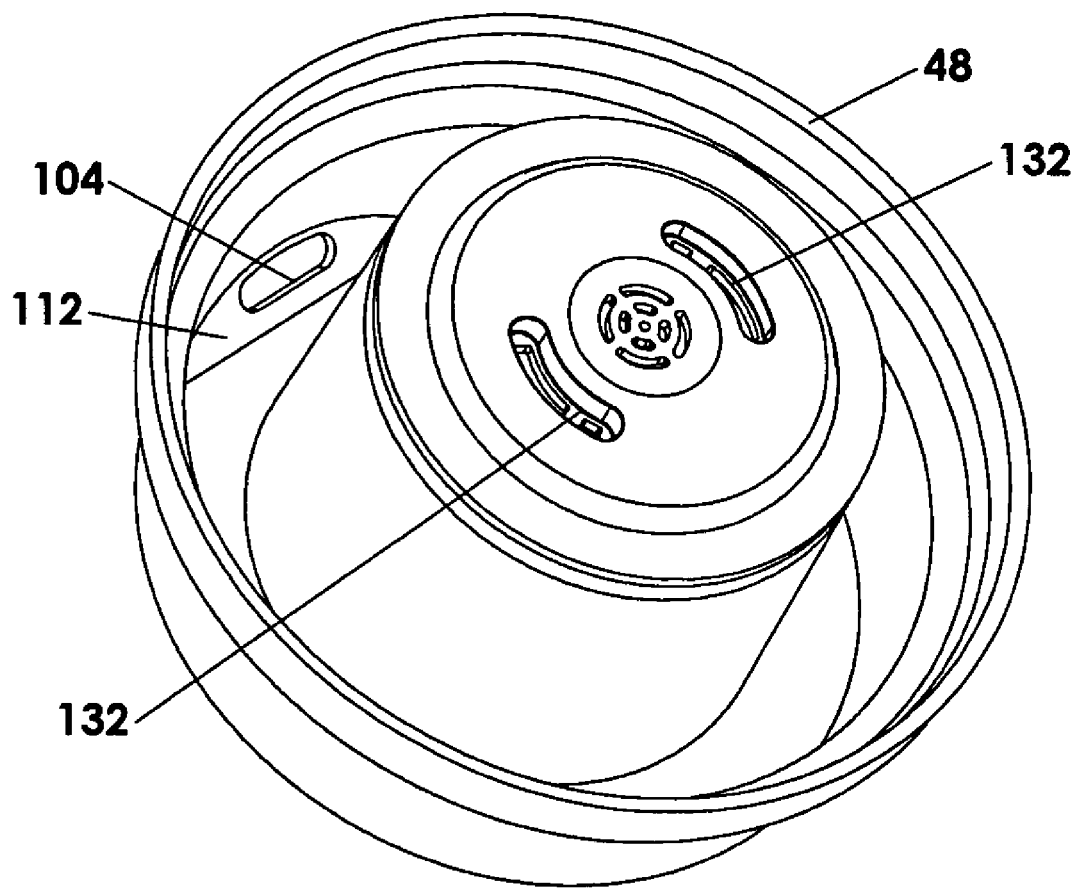
Figure 30:
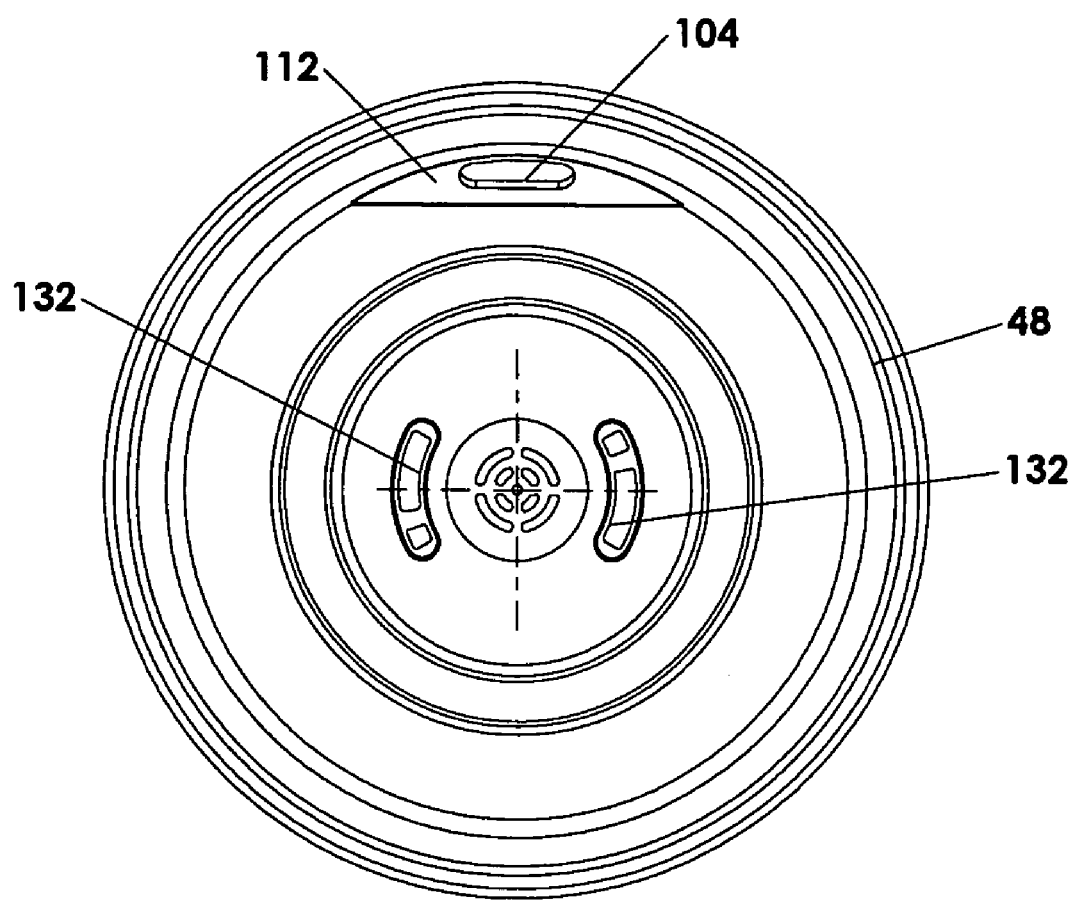
Figure 31:
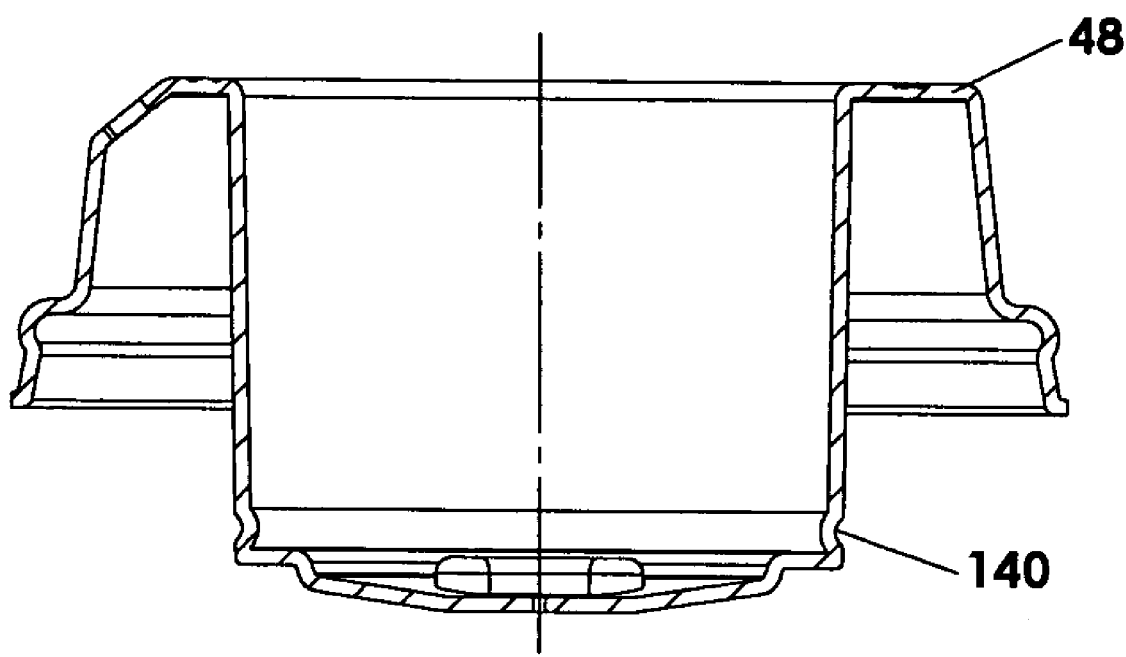

FIGS. 26-28 show various views for a cover 68 of the third embodiment. FIGS. 29-31 show various views for a lid 48 of the third embodiment, which is designed to work with the cover 68. More specifically, FIGS. 26, 27, and 28 show a perspective view, a bottom view, and a cross-section view, respectively, of the cover 68 of the third embodiment. FIGS. 29, 30, and 31 show a perspective view, a bottom view, and a cross-section view, respectively, of the lid 48 of the third embodiment. The cover 68 of the third embodiment includes hook members 130 that extend from the cover 68. Correspondingly, the lid 48 of the third embodiment includes engagement holes 132 adapted to receive and engage with the hook members 130. The hook members 130 may be used in alternative to or in addition to the tongue and groove snap fitting used in the first embodiment (see e.g., FIG. 7), and the hook members 130 may be incorporated into any embodiment of the present invention. One advantage of using the hook members 130 (comparing the third and first embodiments) is increased strength for removably attaching the brewing chamber portion 40 to the lid 48. The hook members 130 may be easily disengaged from the engagement holes 132 by rotating the bottle portion 36 (e.g., using the griping portion 86) and then pulling the bottle portion 36 (along with the brewing chamber portion 40 and the cover 68) away from the lid 48.

Referring to FIG. 31, note that the lid 48 includes a groove 140 adapted to receive a tongue of a secondary fluid chamber portion (not shown in FIG. 31). Also, note that the configuration and placement of the groove 140 differs from the tongue 100 and groove 72 configuration used in the first embodiment (see e.g., FIG. 9). Furthermore, the tongue portion 74 used in the first embodiment (see e.g., FIGS.

9-10) is not incorporated in the third embodiment (see e.g., FIG. 25). Therefore, the third embodiment illustrates further features that may be incorporated into an embodiment, as well as a few possible variations (among many) for an embodiment of the present invention. With the benefit of this disclosure, one of ordinary skill in the art will likely realize many other variations for an embodiment of the present invention.

Although embodiments of the present invention and at least some of its advantages have been described in detail, it should be understood that various changes, substitutions, and alterations can be made herein without departing from the spirit and scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A beverage brewing system adapted to have a brewing configuration, the beverage brewing system comprising:
   a cup;
   a drinking lid having a drinking hole along a periphery region;
   a bottle portion adapted to retain a fluid therein;
   a brewing chamber portion adapted to retain a brewing substance therein; and
   a first blow-out valve member,
   such that in the brewing configuration,
      the brewing chamber portion has the brewing substance therein,
      the bottle portion initially has the fluid therein,
      the drinking lid is located over the cup,
      the bottle portion is removably attached to the drinking lid and located over the drinking lid,
      the brewing chamber portion is located between the bottle portion and the cup, and
      the first blow-out valve member is located between the bottle portion and the brewing chamber portion so that the first blow-out valve member initially hinders a flow of the fluid from the bottle portion to the brewing chamber portion, wherein the first blow-out valve member is adapted to be breached at a first predetermined pressure in the bottle portion and wherein the bottle portion is hermetically sealed at least in part by the first blow-out valve member prior to the first blow-out valve member being breached, wherein the first blow-out valve member differs from the brewing substance.

2. The beverage brewing system of claim 1, wherein the beverage brewing system is adapted to have a storage configuration, and such that in the storage configuration,
   the drinking lid is located over the cup, and
   the bottle portion is located in the cup.

3. The beverage brewing system of claim 2, such that in the storage configuration, the fluid is in the bottle portion.

4. The beverage brewing system of claim 2, such that in the storage configuration, the brewing substance is in the brewing chamber portion.

5. The beverage brewing system of claim 2, such that in the storage configuration, the bottle portion is removably attached to the drinking lid.

6. The beverage brewing system of claim 2, such that in the storage configuration, the brewing chamber portion is located at least partially in the drinking lid.

7. The beverage brewing system of claim 6, such that in the storage configuration, the brewing chamber portion is removably attached to the drinking lid.

8. The beverage brewing system of claim 1, wherein the brewing chamber portion is an integral part of the drinking lid.

9. The beverage brewing system of claim 1, wherein the brewing chamber portion is an integral part of the bottle portion.

10. The beverage brewing system of claim 1, wherein the beverage brewing system is adapted to have a drinking configuration, and such that in the drinking configuration, a brewed fluid is located in the cup, the brewed fluid being derived from brewing the brewing substance in the brewing chamber portion with the fluid after the first blow-out valve member is breached.

11. The beverage brewing system of claim 10, such that in the drinking configuration,
   the bottle portion is removed from the drinking lid, and
   the drinking lid is removably attached to the cup.

12. The beverage brewing system of claim 10, such that in the drinking configuration,
   the bottle portion and the brewing chamber portion are removed from the drinking lid, and
   the drinking lid is removably attached to the cup.

13. The beverage brewing system of claim 10, such that in the drinking configuration, the bottle portion, the brewing chamber portion, and the drinking lid are removed from the cup.

14. The beverage brewing system of claim 1, wherein the brewing chamber portion has a first hole formed therein, wherein the first blow-out valve member is bonded to a surface of the brewing chamber portion to cover the first hole, and wherein the first blow-out valve member is adapted to at least partially separate from the surface of the brewing chamber portion at the first predetermined pressure.

15. The beverage brewing system of claim 14, wherein the surface of the brewing chamber portion has a raised portion adjacent to the first blow-out valve member.

16. The beverage brewing system of claim 14, wherein the first blow-out valve member is separated from the brewing substance by a first spaced distance.

17. The beverage brewing system of claim 1, wherein the brewing substance comprises ground coffee beans, and wherein the fluid is water.

18. The beverage brewing system of claim 1, wherein the brewing substance comprises tea leaves, and wherein the fluid is water.

19. The beverage brewing system of claim 1, wherein the brewing substance comprises elements selected from the group consisting of fruit, herb, sugar, an artificial sweetener, a dehydrated edible substance, dehydrated milk, dehydrated cream, a concentrated edible substance, a concentrated drink mix, an instant drink mix, and combinations thereof.

20. The beverage brewing system of claim 1, further comprising a filter member located between the brewing substance and the brewing chamber portion when the brewing substance is operably installed in the brewing chamber portion.

21. The beverage brewing system of claim 1, further comprising:
a secondary fluid chamber portion adapted to retain a secondary liquid substance therein, the secondary fluid chamber portion having a hole formed therein; and
a second blow-out valve member bonded to the secondary fluid chamber portion to cover the hole, the second blow-out valve member being adapted to be breached at a second predetermined pressure.

22. The beverage brewing system of claim 21, wherein a recess is formed in the secondary fluid chamber portion, wherein the hole is formed in the recess, and wherein the second blow-out valve member is at least partially located in the recess.

23. The beverage brewing system of claim 21, such that in the brewing configuration, the secondary fluid chamber portion is attached to the drinking lid adjacent to the brewing chamber portion.

24. The beverage brewing system of claim 21, wherein the secondary fluid chamber portion is removably attached to the drinking lid.

25. The beverage brewing system of claim 21, wherein the secondary fluid chamber portion has the secondary liquid substance therein, and wherein the secondary liquid substance comprises a milk product.

26. The beverage brewing system of claim 1, wherein the entire system is disposable.

27. The beverage brewing system of claim 26, wherein the drinking lid, the brewing chamber portion, and the bottle portion, each is made from a material selected from the group consisting of recyclable plastic, at least partially recycled plastic, polypropylene, polyethylene, polycarbonate, waxed paper, paper, and combinations thereof.

28. The beverage brewing system of claim 26, wherein the system in the brewing configuration is microwavable.

29. The beverage brewing system of claim 1, wherein the cup has a step feature extending from an inside surface of the cup, wherein the bottle portion has a recess formed on an outside surface thereof, and wherein the step feature of the cup is adapted to mate with the recess formed in the bottle portion in a storage configuration of the system.

30. The beverage brewing system of claim 1, wherein the brewing chamber portion includes a hook member extending therefrom, wherein the drinking lid includes an engagement hole adapted to receive the hook member therein.

31. A beverage brewing system adapted to have a storage configuration and a brewing configuration, the beverage brewing system comprising:
a cup;
a drinking lid having a drinking aperture configured to dispense fluid into a mouth;
a bottle portion adapted to retain a fluid therein;
a brewing chamber portion adapted to retain a brewing substance therein; and
a blow-out valve member;
such that in the storage configuration,
the drinking lid is located over the cup, and
the bottle portion is located in the cup; and
such that in the brewing configuration,
the brewing chamber portion has the brewing substance therein,
the bottle portion initially has the fluid therein,
the drinking lid is located over the cup,
the bottle portion is removably attached to the drinking lid and located over the drinking lid,
the brewing chamber portion is located between the bottle portion and the cup,
the bottle portion and the brewing chamber portion are supported by the drinking lid, and
the blow-out valve member is located between the bottle portion and the brewing chamber portion so that the blow-out valve member initially prevents a flow of the fluid from the bottle portion to the brewing chamber portion, wherein the bottle portion is hermetically sealed at least in part by the blow-out valve member prior to the blow-out valve member being ruptured by pressure from within the bottle portion, and wherein the blow-out valve member differs from the brewing substance.

32. The beverage brewing system of claim 31, such that in the storage configuration, the fluid is in the bottle portion.

33. The beverage brewing system of claim 31, such that in the storage configuration, the brewing substance is in the brewing chamber portion.

34. The beverage brewing system of claim 31, such that in the storage configuration, the bottle portion is removably attached to the drinking lid.

35. The beverage brewing system of claim 31, such that in the storage configuration, the brewing chamber portion is located at least partially in the drinking lid.

36. The beverage brewing system of claim 35, such that in the storage configuration, the brewing chamber portion is an integral part of the drinking lid.

37. The beverage brewing system of claim 35, such that in the storage configuration, the brewing chamber portion is removably attached to the drinking lid.

38. The beverage brewing system of claim 37, such that in the storage configuration, the brewing chamber portion is an integral part of the bottle portion.

39. The beverage brewing system of claim 31, wherein the beverage brewing system is adapted to have a drinking configuration, and such that in the drinking configuration, a brewed fluid is located in the cup, the brewed fluid being derived from brewing the brewing substance in the brewing chamber portion with the fluid after the blow-out valve member is breached.

40. The beverage brewing system of claim 39, such that in the drinking configuration,
the bottle portion is removed from the drinking lid, and
the drinking lid is removably attached to the cup.

41. The beverage brewing system of claim 39, such that in the drinking configuration,
the bottle portion and the brewing chamber portion are removed from the drinking lid, and
the drinking lid is removably attached to the cup.

42. The beverage brewing system of claim 39, such that in the drinking configuration, the bottle portion, the brewing chamber portion, and the drinking lid are removed from the cup.

43. The beverage brewing system of claim 31, wherein the brewing chamber portion includes a hook member extending therefrom, wherein the drinking lid includes an engagement hole adapted to receive the hook member therein.

44. A beverage brewing system adapted to have a storage configuration, a brewing configuration, and a drinking configuration, the beverage brewing system comprising:

a cup;
a drinking lid;
a bottle portion adapted to retain a fluid therein;
a brewing chamber portion adapted to retain a brewing substance therein; and
a blow-out valve member;
such that in the storage configuration,
   the drinking lid is located over the cup, and
   the bottle portion is located in the cup;
such that in the brewing configuration,
   the brewing chamber portion has the brewing substance therein,
   the bottle portion initially has the fluid therein,
   the drinking lid is located over the cup,
   the bottle portion is removably attached to the drinking lid and located over the drinking lid,
   the brewing chamber portion is located between the bottle portion and the cup, and
   the blow-out valve member is located between the bottle portion and the brewing chamber portion so that the blow-out valve member initially prevents a flow of the fluid from the bottle portion to the brewing chamber portion, wherein the bottle portion is hermetically sealed at least in part by the blow-out valve member prior to the blow-out valve member being ruptured by pressure from within the bottle portion, and wherein the blow-out valve member differs from the brewing substance; and
such that in the drinking configuration, a brewed fluid is located in the cup, the brewed fluid being derived from brewing the brewing substance in the brewing chamber portion with the fluid after the blow-out valve member is breached by pressure from within the bottle portion, the drinking lid having an aperture positioned to allow a person to drink the brewed fluid from the cup without removing the drinking lid.

45. The beverage brewing system of claim 44, such that in the drinking configuration,
the bottle portion is removed from the drinking lid, and
the drinking lid is removably attached to the cup.

46. The beverage brewing system of claim 44, such that in the drinking configuration,
the bottle portion and the brewing chamber portion are removed from the drinking lid, and
the drinking lid is removably attached to the cup.

47. The beverage brewing system of claim 44, such that in the drinking configuration, the bottle portion, the brewing chamber portion, and the drinking lid are removed from the cup.

48. The beverage brewing system of claim 44, wherein the drinking lid is substantially flush with the cup where the drinking lid and an outer surface of the cup meet.

49. A disposable beverage brewing system adapted to have a brewing configuration, the disposable beverage brewing system comprising:
a disposable drinking cup;
a disposable plastic drinking lid attachable to the disposable drinking cup and having a drinking hole to dispense fluid in the disposable drinking cup without removing the disposable plastic drinking lid;
a disposable plastic bottle portion adapted to retain a fluid therein;
a disposable plastic brewing chamber portion adapted to retain a brewing substance therein, the disposable plastic brewing chamber portion having a first hole formed therein; and
a plastic blow-out valve member bonded to a surface of the disposable plastic brewing chamber portion to cover the first hole, the plastic blow-out valve member being adapted to at least partially separate from the surface of the disposable plastic brewing chamber portion at a first predetermined pressure,
such that in the brewing configuration,
   the disposable plastic brewing chamber portion has the brewing substance therein,
   the disposable plastic bottle portion initially has the fluid therein,
   the disposable plastic drinking lid is located over the disposable drinking cup,
   the disposable plastic bottle portion is removably attached to the disposable plastic drinking lid and located over the disposable plastic drinking lid,
   the disposable plastic bottle portion is hermetically sealed prior to the plastic blow-out valve member being at least partially separated from the surface of the disposable plastic brewing chamber portion;
   the disposable plastic brewing chamber portion is located between the disposable plastic bottle portion and the disposable drinking cup,
   the disposable plastic bottle portion and the disposable plastic brewing chamber portion are supported by the disposable plastic drinking lid, and
   the first hole and the plastic blow-out valve member are located between the disposable plastic bottle portion and the disposable plastic brewing chamber portion so that the plastic blow-out valve member initially hinders a flow of the fluid from the disposable plastic bottle portion to the disposable plastic brewing chamber through the first hole.

50. A method of brewing a beverage using a beverage brewing system, the method comprising:
removing a freshness seal covering one or more drip holes that open to an interior of a brewing chamber portion;
forming a brewing configuration for the system, such that
   a drinking lid is over a cup, the drinking lid having a sipping hole for dispensing contents of the cup,
   the drinking lid has a bottle portion removably attached thereto,
   the drinking lid is located between the bottle portion and the cup,
   the drinking lid supports the bottle portion,
   the bottle portion has a fluid therein,
   a brewing chamber portion comprises a brewing substance therein,
   the brewing chamber portion is located between the bottle portion and the cup,
   the brewing chamber portion has a first hole formed therein,
   a first blow-out valve member is bonded to a surface of the brewing chamber portion to cover the first hole, and
   the bottle portion is hermetically sealed initially at least in part by the first blow-out valve member;
heating contents in the bottle portion, thereby increasing the temperature and pressure of the contents within the bottle portion, the contents including the fluid;
when the heated contents within the bottle portion reach a first predetermined pressure, breaching the first blow-out valve member using the heated contents within the bottle portion, thereby allowing the fluid to enter the brewing chamber portion;
brewing the brewing substance with the fluid in the brewing chamber portion; and dispensing a brewed fluid downwardly into the cup from the brewing chamber portion via the drip holes.

51. The method of claim 50, wherein the breaching of the first blow-out valve member comprises at least partially separating the first blow-out valve member from the surface of the brewing chamber portion using the contents.

52. The method of claim 50, wherein the breaching of the first blow-out valve member comprises forming a breach hole in the first blow-out valve member using the contents.

53. The method of claim 50, wherein the heating of the contents is performed in a microwave oven.

54. The method of claim 50, further comprising:
forming a drinking configuration after the dispensing of the brewed fluid into the cup, wherein the forming of the drinking configuration comprises removing the bottle portion from the drinking lid.

55. The method of claim 54, wherein the brewing chamber portion is removably aft ached to the drinking lid in the brewing configuration, wherein the forming of the drinking configuration comprises removing the brewing chamber portion from the drinking lid.

56. The method of claim 55, wherein the brewing chamber portion is an integral part of the bottle portion.

57. The method of claim 50, further comprising:
forming a drinking configuration after the dispensing of the brewed fluid into the cup, wherein the forming of the drinking configuration comprises removing the drinking lid, the bottle portion, and the brewing chamber portion from the cup.

58. The method of claim 50, wherein the forming of the brewing configuration comprises:
removing the drinking lid, the brewing chamber portion, and the bottle portion from the cup, wherein initially the system was in a storage configuration prior to the removing of the drinking lid, the brewing chamber portion, and the bottle portion, wherein the storage configuration of the system is such that
the drinking lid is located over the cup, and
the bottle portion is located in the cup;
turning over the drinking lid;
placing the drinking lid over the cup, such that in the storage configuration, a first side of the drinking lid faces a bottom of an interior of the cup, and such that in the brewing configuration, a second side of the drinking lid faces the bottom of the cup interior.

59. The method of claim 58, such that in the storage configuration, the fluid is in the bottle portion.

60. The method of claim 58, such that in the storage configuration, the brewing substance is in the brewing chamber portion.

61. The method of claim 58, such that in the storage configuration, the bottle portion is removably attached to the drinking lid.

62. The method of claim 58, such that in the storage configuration, the brewing chamber portion is located at least partially in the drinking lid.

63. The method of claim 58, such that in the storage configuration, the brewing chamber portion is an integral part of the drinking lid.

64. The method of claim 58, such that in the storage configuration, the brewing chamber portion is removably attached to the drinking lid.

65. The method of claim 58, such that in the storage configuration, the brewing chamber portion is an integral part of the bottle portion.

66. The method of claim 50, wherein the system further comprises a secondary fluid chamber portion adapted to retain a secondary liquid substance therein, the secondary fluid chamber portion having a secondary hole formed therein, and
a second blow-out valve member bonded to the secondary fluid chamber portion to cover the secondary hole, the second blow-out valve member being adapted to be breached at a second predetermined pressure;
such that in the brewing configuration,
the secondary fluid chamber portion has the secondary liquid substance therein,
the secondary fluid chamber portion is hermetically sealed at least in part by the secondary blow-out valve member, and
the secondary fluid chamber portion is removably attached to the drinking lid; and
wherein the method further comprises
heating the secondary liquid substance in the secondary fluid chamber portion, thereby increasing the temperature of the secondary liquid substance and increasing the pressure within the secondary fluid chamber portion, and
when the second predetermined pressure is reached in the secondary fluid chamber portion, breaching the second blow-out valve member at least in part using the heated secondary liquid substance within the secondary fluid chamber portion, thereby allowing the secondary liquid substance to enter the cup to be at least partially mixed with the brewed fluid.

67. The method of claim 66, wherein the brewed fluid is coffee and the secondary liquid substance is a milk product.

68. The method of claim 50, further comprising:
obtaining the beverage brewing system from a vending machine; and
placing the beverage brewing system in a microwave oven, such that the system is in the brewing configuration during the heating, wherein the heating is performed using the microwave oven.

69. A beverage brewing system adapted to have a shipping/storage configuration and a brewing configuration, the beverage brewing system comprising:
a cup;
a drinking lid having an aperture for dispensing fluid; and
a bottle having a fluid chamber portion and a brewing chamber portion,
such that in the shipping/storage configuration, the fluid chamber portion comprises water therein, the brewing chamber portion comprises a brewing substance therein, the fluid chamber portion is hermetically sealed, the water in the fluid chamber portion does not contact the brewing substance in the brewing chamber portion, at least a majority of the bottle is within an interior region of the cup, and the drinking lid is located over the cup and the bottle, and
such that in the brewing configuration, the bottle is removably attached to the drinking lid, the fluid chamber portion is located over the cup, with the brewing chamber portion located between the fluid chamber portion and the interior region of the cup.

70. The beverage brewing system of claim 69, further comprising a blow-out valve member, the blow-out valve member differing from the brewing substance,
such that in the brewing configuration, the fluid chamber portion remains hermetically sealed and the water within the fluid chamber portion does not contact the brewing substance until the water in the fluid chamber portion reaches a pressure sufficient to breach the blow-out valve member.

71. The beverage brewing system of claim 69, wherein the drinking lid is removably attached to the cup in the brewing configuration, and wherein the drinking lid is removably attached to the bottle in the shipping/storage configuration and in the brewing configuration.

* * * * *

UNITED STATES PATENT AND TRADEMARK OFFICE
CERTIFICATE OF CORRECTION

PATENT NO. : 7,387,063 B2  
APPLICATION NO. : 10/878581  
DATED : June 17, 2008  
INVENTOR(S) : Vu et al.

Page 1 of 1

It is certified that error appears in the above-identified patent and that said Letters Patent is hereby corrected as shown below:

In Col. 23, line 18, delete "aft ached" and insert --attached--.

Signed and Sealed this

Twenty-third Day of September, 2008

JON W. DUDAS  
*Director of the United States Patent and Trademark Office*